US012571889B2

(12) United States Patent
Kubota et al.

(10) Patent No.: US 12,571,889 B2
(45) Date of Patent: Mar. 10, 2026

(54) DISTANCE MEASUREMENT DEVICE

(71) Applicant: KABUSHIKI KAISHA TOSHIBA, Tokyo (JP)

(72) Inventors: Hiroshi Kubota, Yokohama Kanagawa (JP); Nobu Matsumoto, Ebina Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1227 days.

(21) Appl. No.: 17/462,127

(22) Filed: Aug. 31, 2021

(65) Prior Publication Data

US 2022/0082671 A1 Mar. 17, 2022

(30) Foreign Application Priority Data

Sep. 11, 2020 (JP) ................................. 2020-152720

(51) Int. Cl.
G01S 7/4865 (2020.01)
G01S 17/10 (2020.01)
G01S 17/894 (2020.01)

(52) U.S. Cl.
CPC ............ G01S 7/4865 (2013.01); G01S 17/10 (2013.01); G01S 17/894 (2020.01)

(58) Field of Classification Search
CPC ...... G01S 7/4865; G01S 17/10; G01S 17/894; G01S 7/4863; G01S 7/487; G01S 17/89
See application file for complete search history.

(56) References Cited

U.S. PATENT DOCUMENTS

| 6,393,377 | B1 | | 5/2002 | Shirai et al. | |
|---|---|---|---|---|---|
| 8,072,582 | B2 | | 12/2011 | Meneely | |
| 10,571,570 | B1 | * | 2/2020 | Paulsen | G01S 17/10 |
| 2017/0363740 | A1 | * | 12/2017 | Kubota | G01S 7/484 |
| 2019/0086541 | A1 | * | 3/2019 | Kubota | G01S 7/484 |
| 2019/0086542 | A1 | * | 3/2019 | Kubota | G01S 7/4863 |
| 2019/0317213 | A1 | | 10/2019 | Kubota et al. | |
| 2020/0025922 | A1 | * | 1/2020 | Birnbacher | G01S 7/486 |
| 2020/0088853 | A1 | | 3/2020 | Kubota et al. | |

(Continued)

FOREIGN PATENT DOCUMENTS

| JP | H5-79954 A | 11/1993 |
|---|---|---|
| JP | 3849324 B2 | 11/2006 |

(Continued)

*Primary Examiner* — Yuqing Xiao
*Assistant Examiner* — Chia-Ling Chen
(74) *Attorney, Agent, or Firm* — Finnegan, Henderson, Farabow, Garrett & Dunner, LLP

(57) ABSTRACT

A distance measurement device includes a light source; an optical system configured to emit emission light from the light source and to receive reflected light of the emission light; a plurality of pixels configured to detect the received reflected light, each including at least one sensor, and arranged in a pixel area on a substrate; and a control circuit. The control circuit is configured to: identify first reflected light detected in a first pixel in association with first emission light; and measure a distance based on a time difference between the first emission light and the identified first reflected light. The first emission light includes a first, second, and third pulse in succession. A first interval between the first and second pulse differs from a second interval between the second and third pulse.

11 Claims, 20 Drawing Sheets

From AFE 41 42

71 Pre-processing section

72 Memory

73 Averaging section

FIRIN

74 First filter
First peak candidates
Second filter 76
FIR1OUT
FIR2OUT

75 First peak candidate detection section
Second peak candidate detection section 77
First and second peak candidates 78 Reliability calculation section 79 Distance measurement section To external device

(56)         References Cited

U.S. PATENT DOCUMENTS

| | | | |
|---|---|---|---|
| 2020/0273895 A1* | 8/2020 | Sasago | H10F 39/8037 |
| 2020/0292677 A1 | 9/2020 | Kubota et al. | |
| 2021/0026012 A1 | 1/2021 | Kubota et al. | |
| 2021/0063575 A1 | 3/2021 | Kubota et al. | |
| 2021/0255288 A1* | 8/2021 | Liobe | G01S 7/4873 |
| 2021/0333360 A1* | 10/2021 | Luo | G01S 7/487 |
| 2023/0108583 A1* | 4/2023 | Azuma | G01S 7/4863 |
| | | | 356/5.01 |

FOREIGN PATENT DOCUMENTS

| | | | |
|---|---|---|---|
| JP | 2010-48810 A | 3/2010 | |
| JP | 2018-59826 A | 4/2018 | |
| JP | 2019-56567 A | 4/2019 | |
| JP | 2019-78602 A | 5/2019 | |
| JP | 2020-46247 A | 3/2020 | |

* cited by examiner

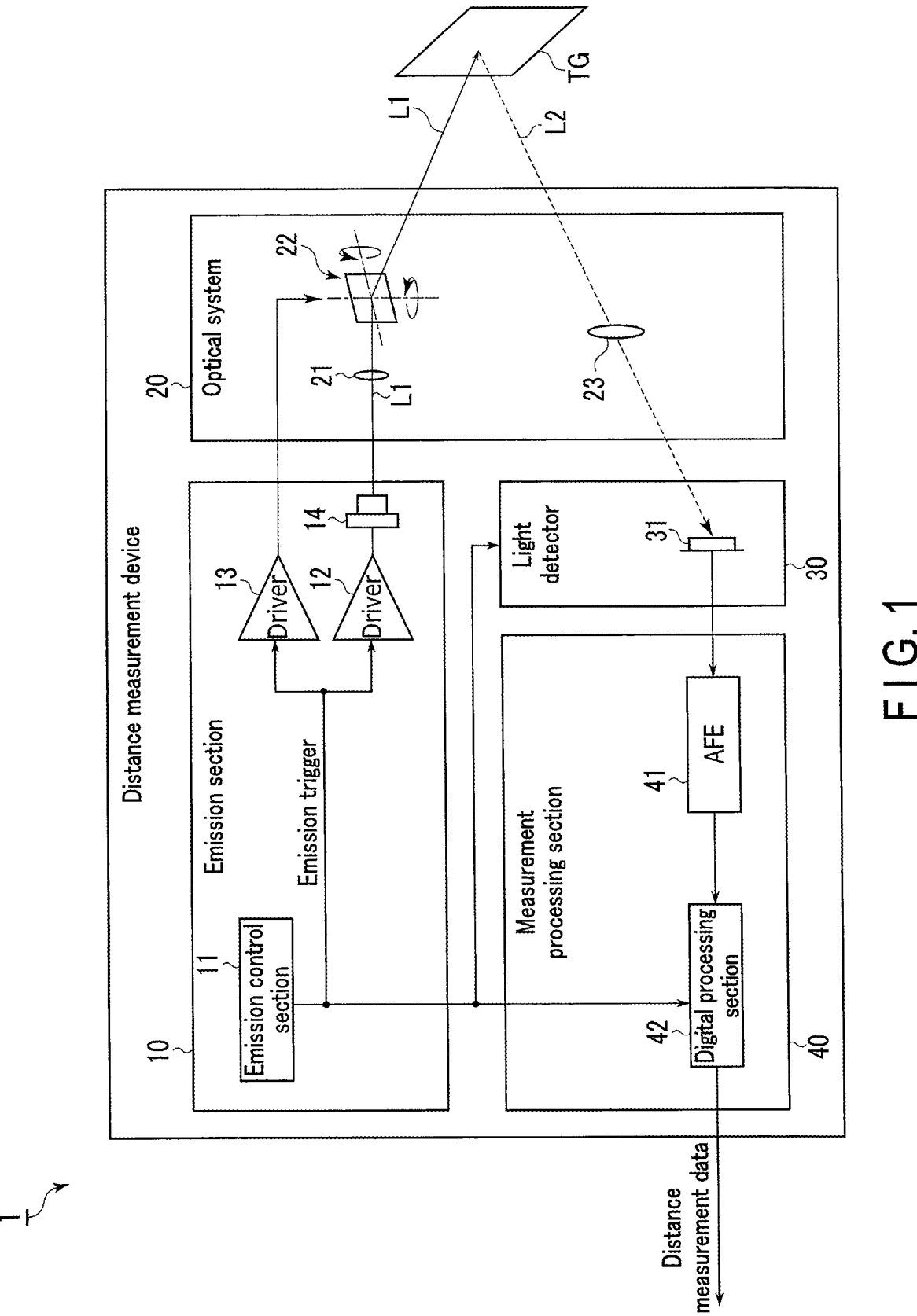
F I G. 1

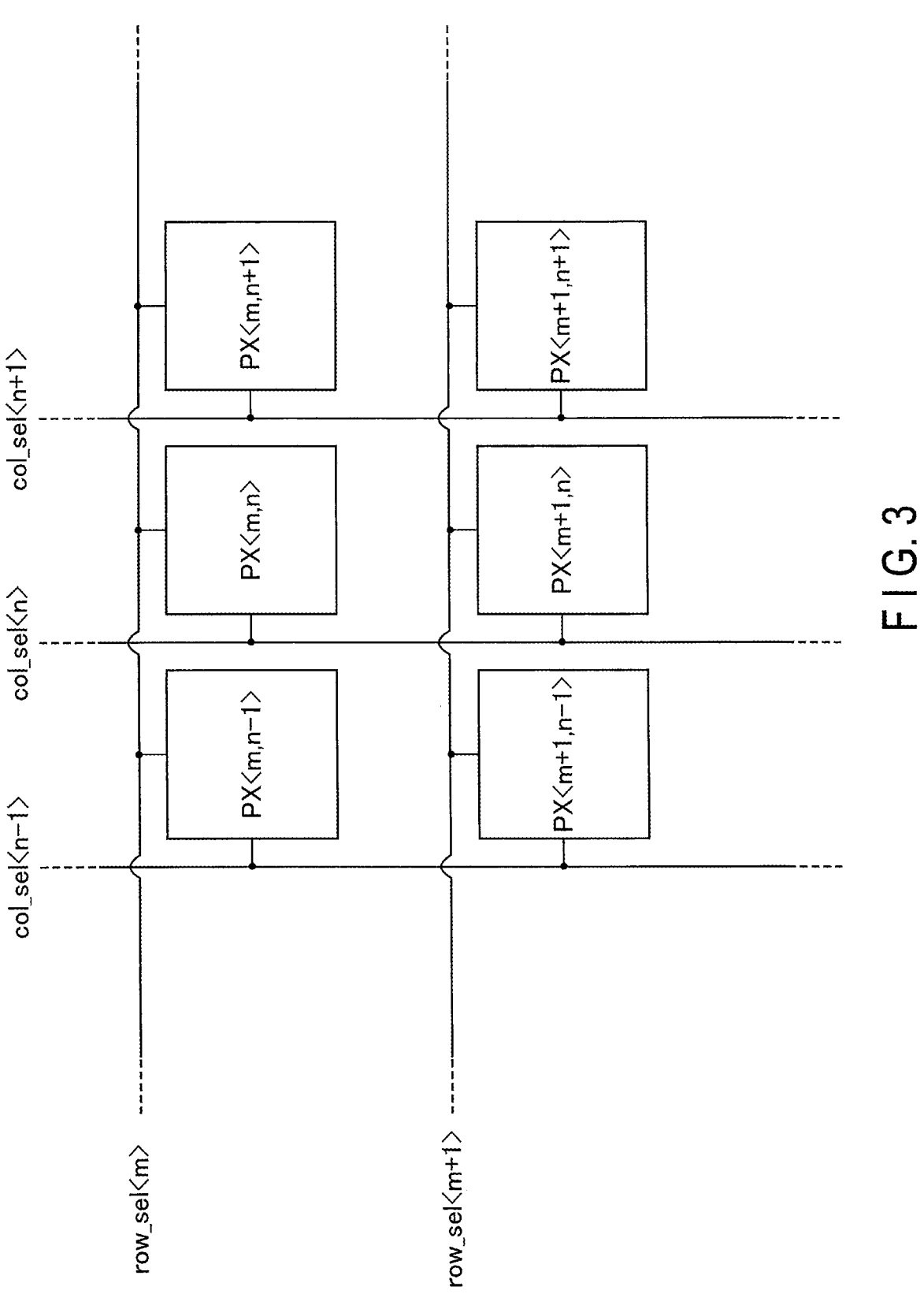
F I G. 3

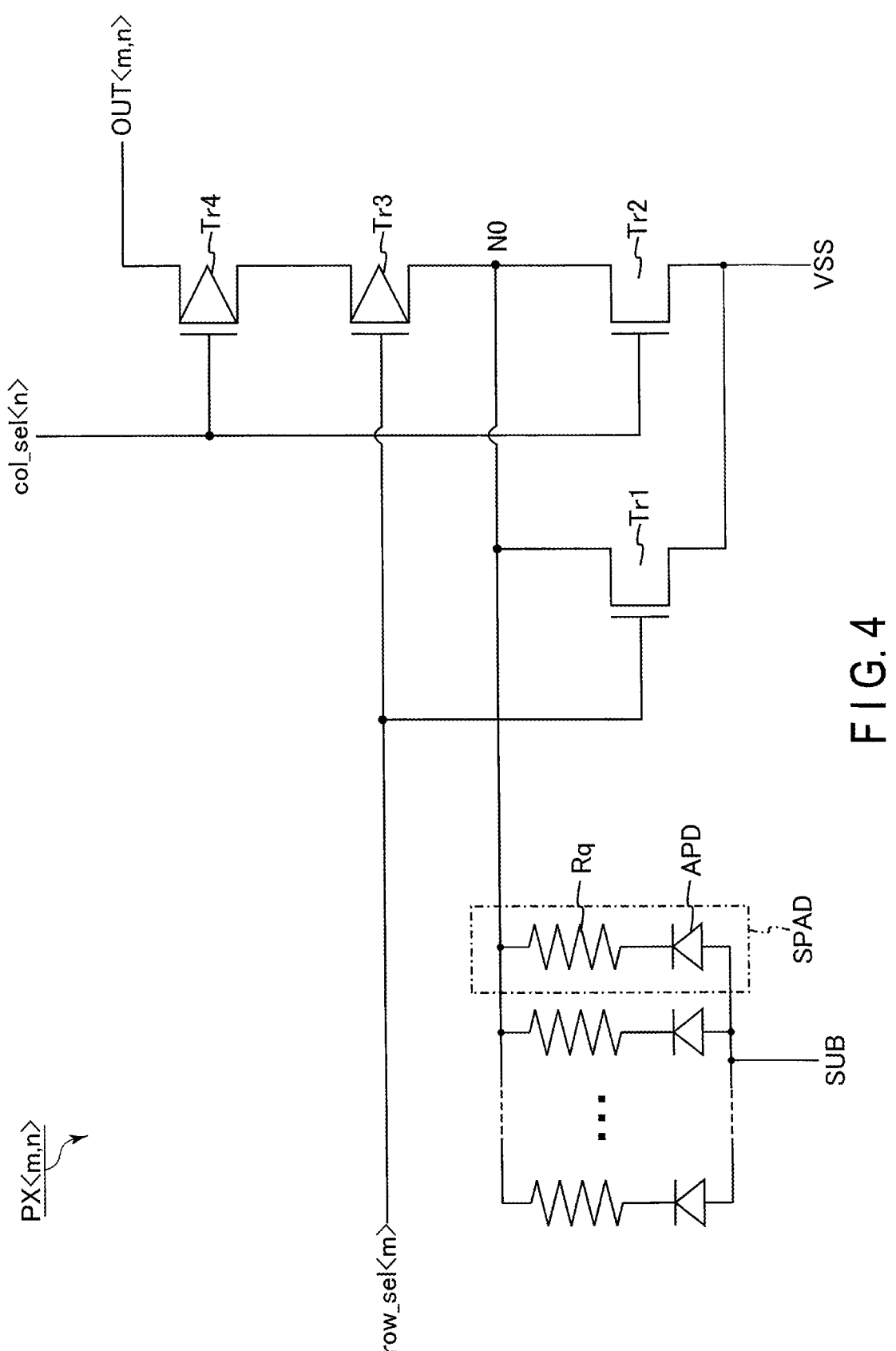
F I G. 4

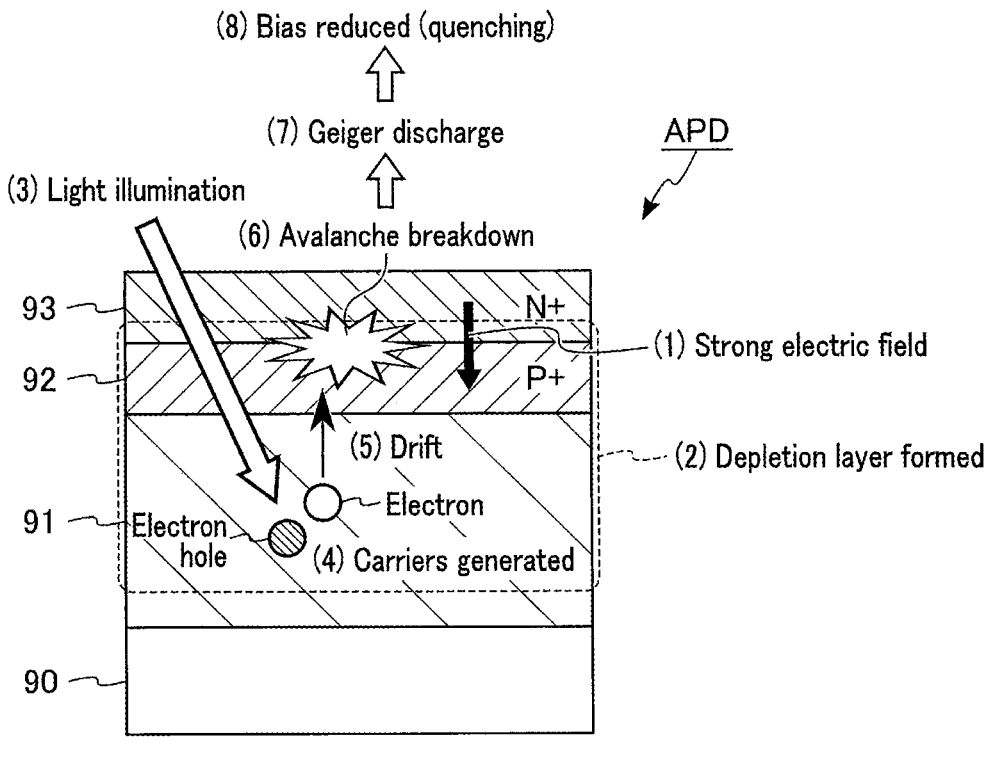
F I G. 5

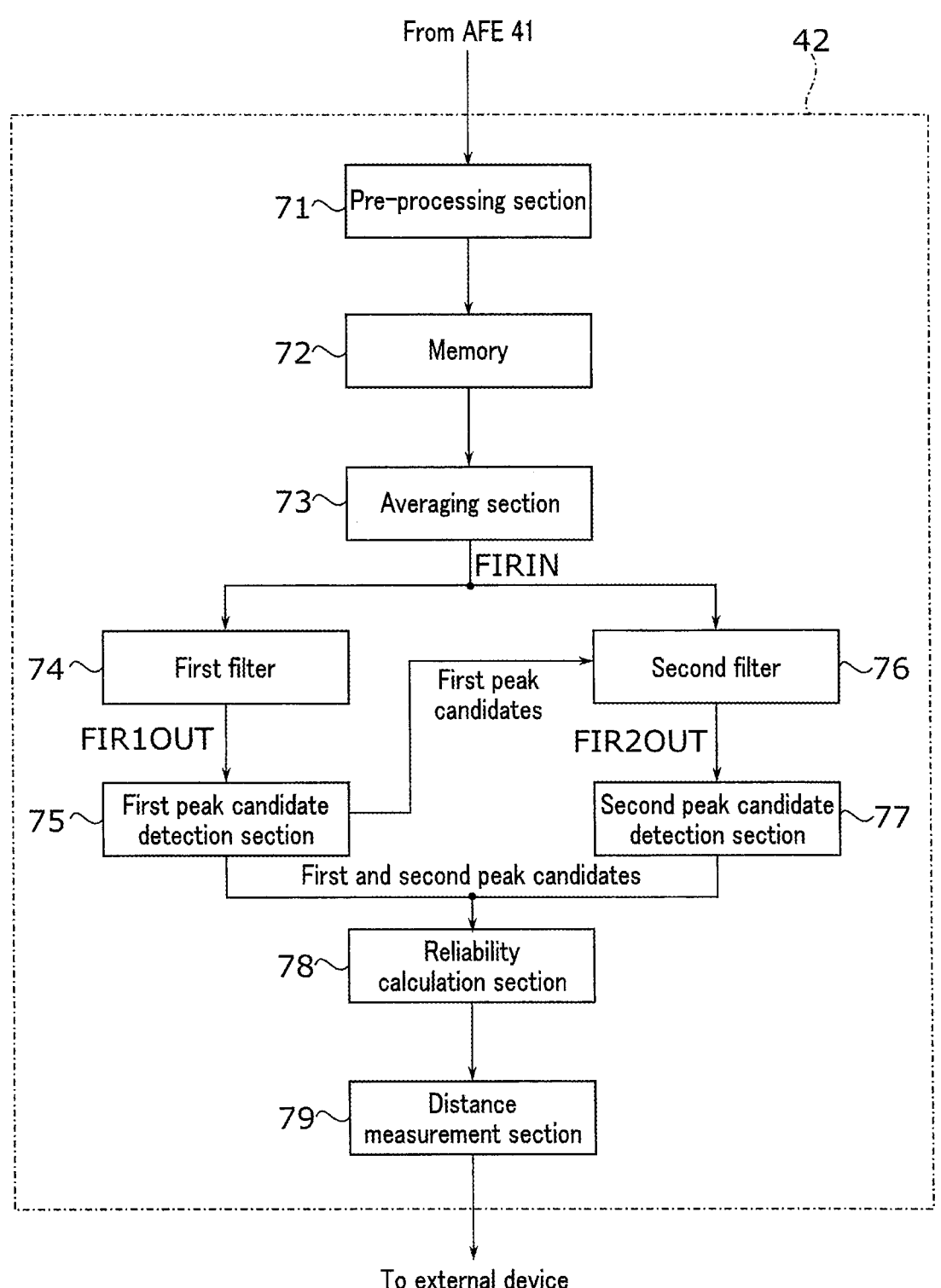
F I G. 6

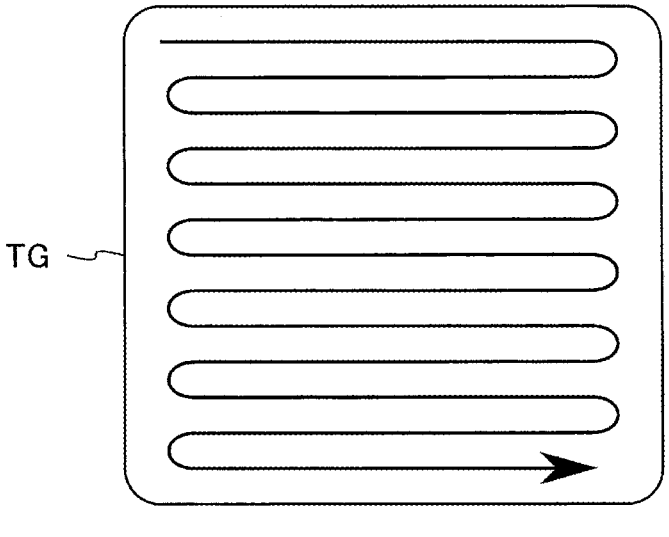
TG
F I G. 8
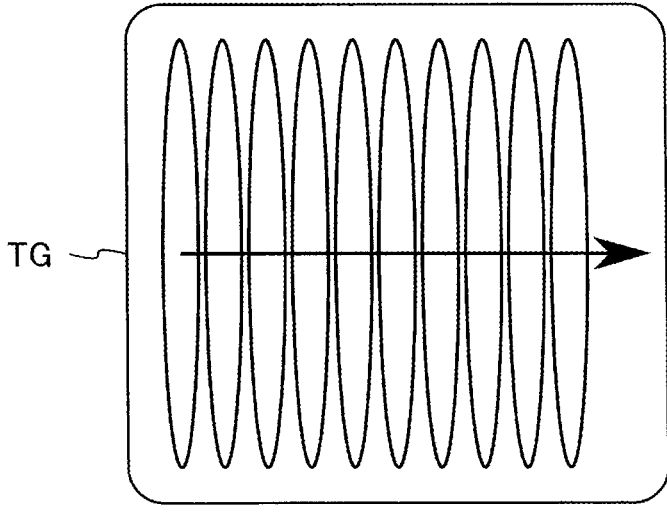
TG
F I G. 9

TG
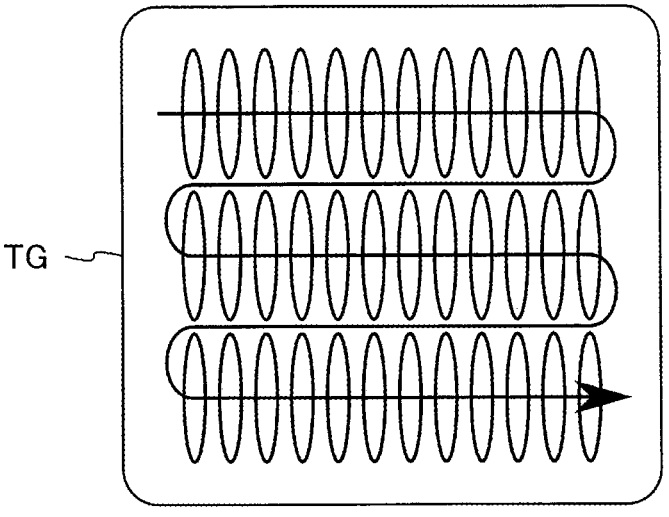
F I G. 10

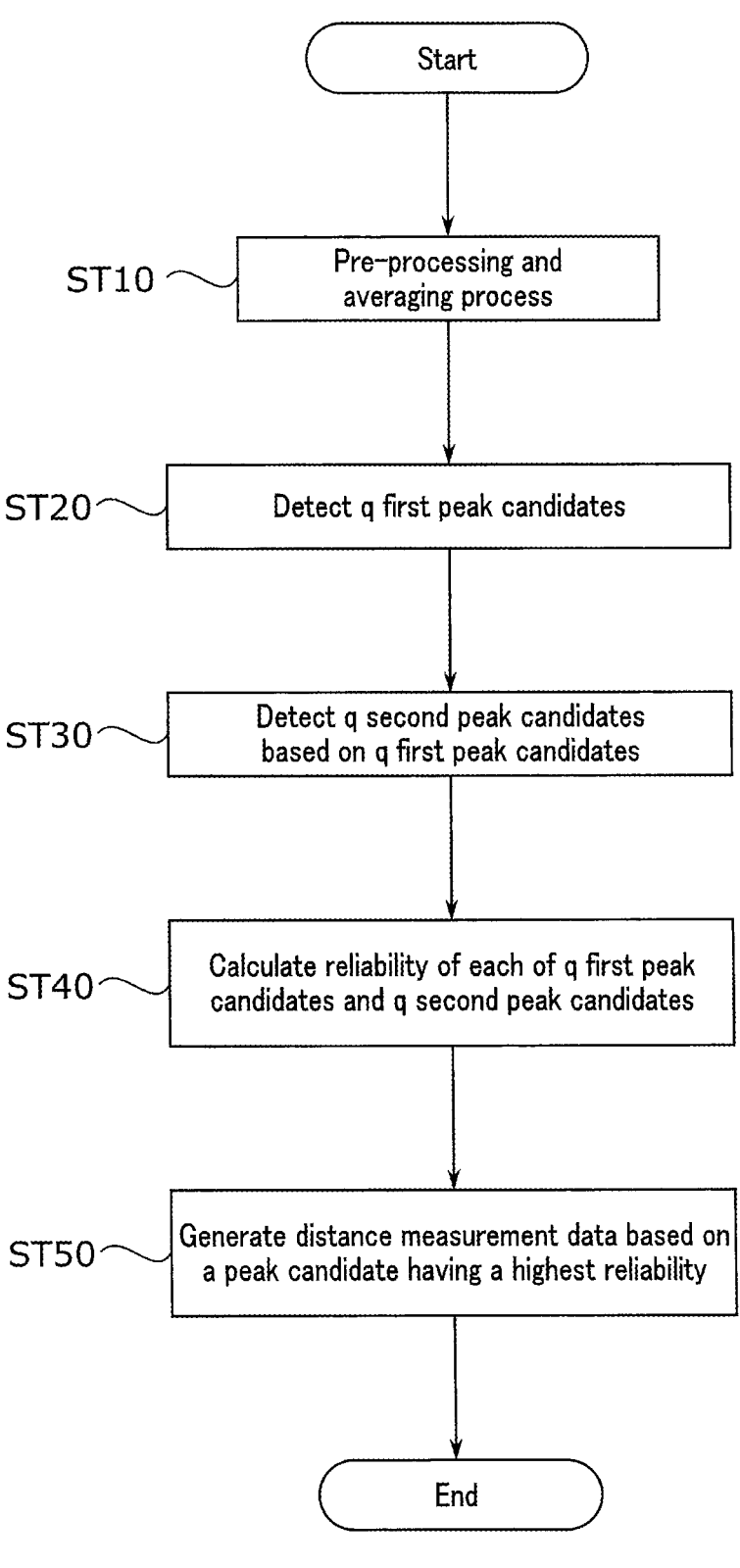
F I G. 11

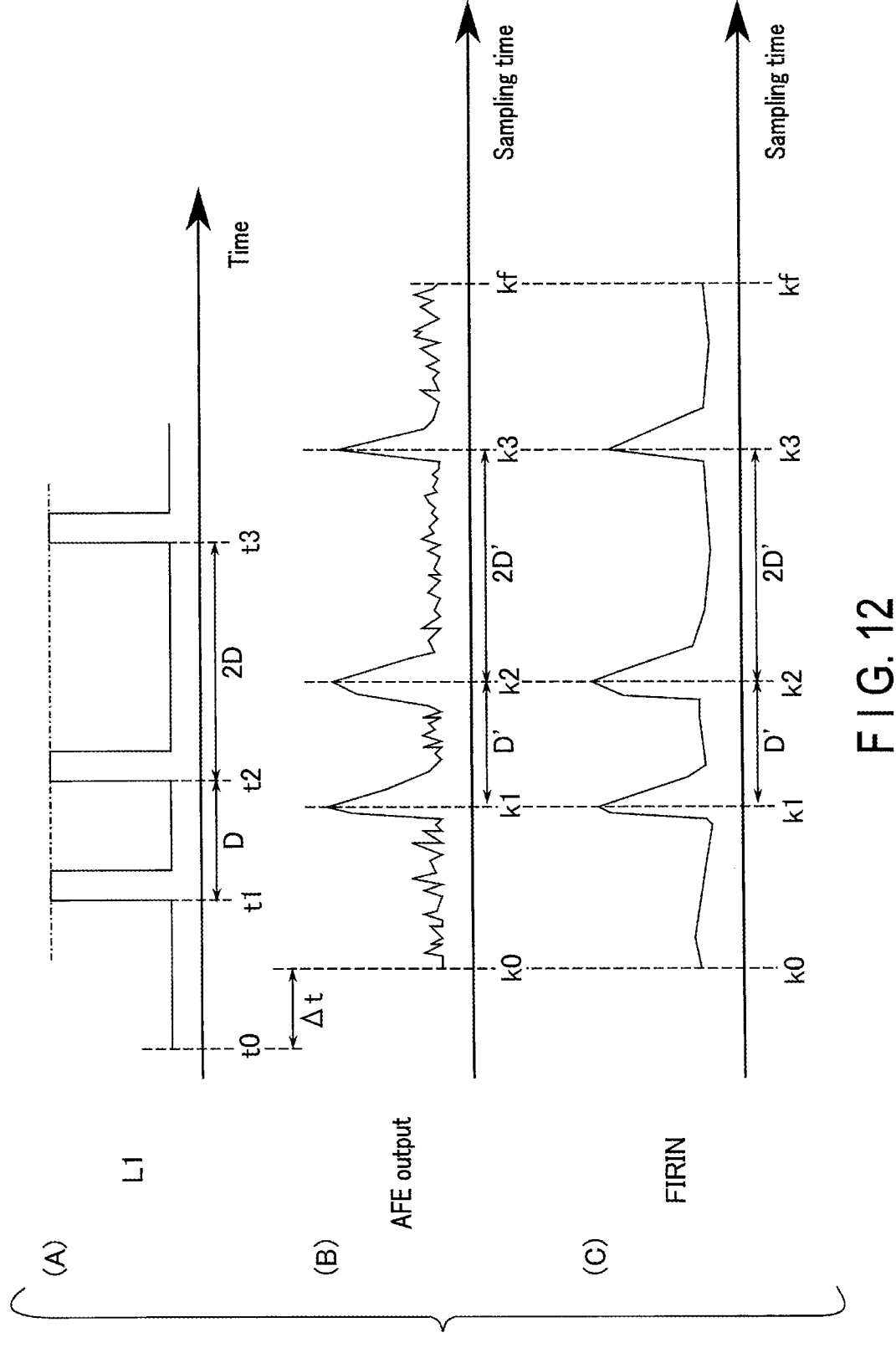
F I G. 12

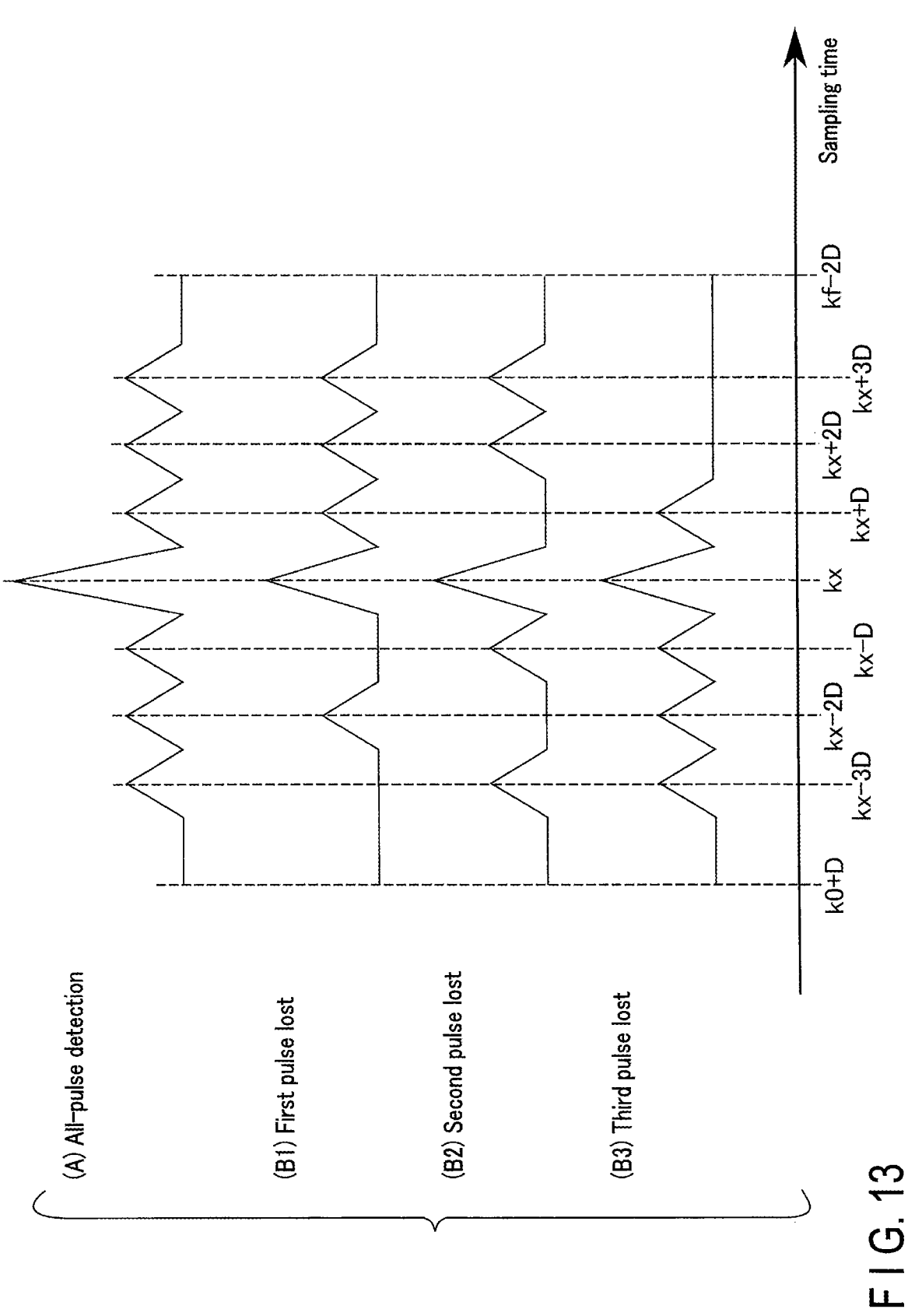
F I G. 13

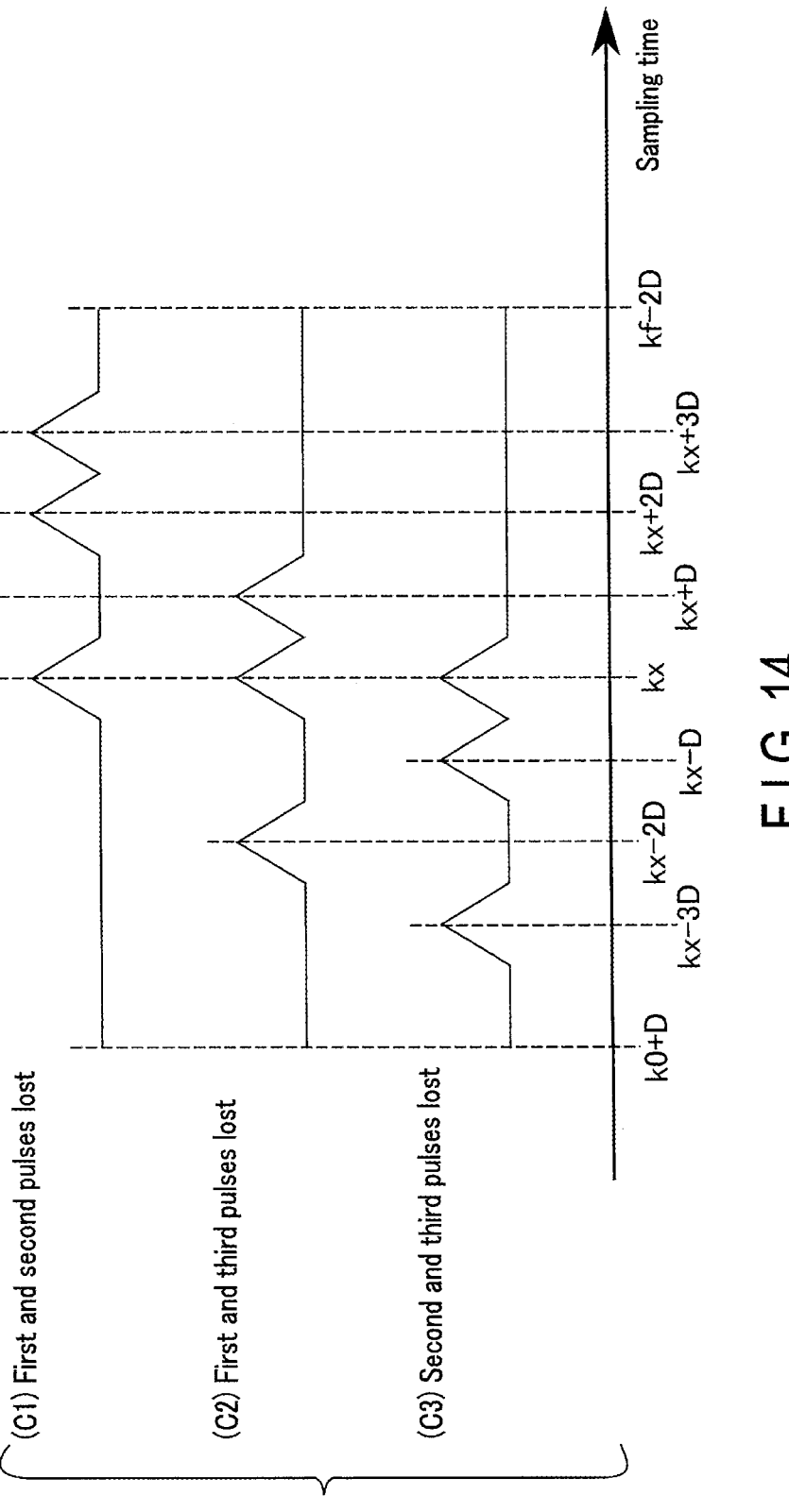
F I G. 14

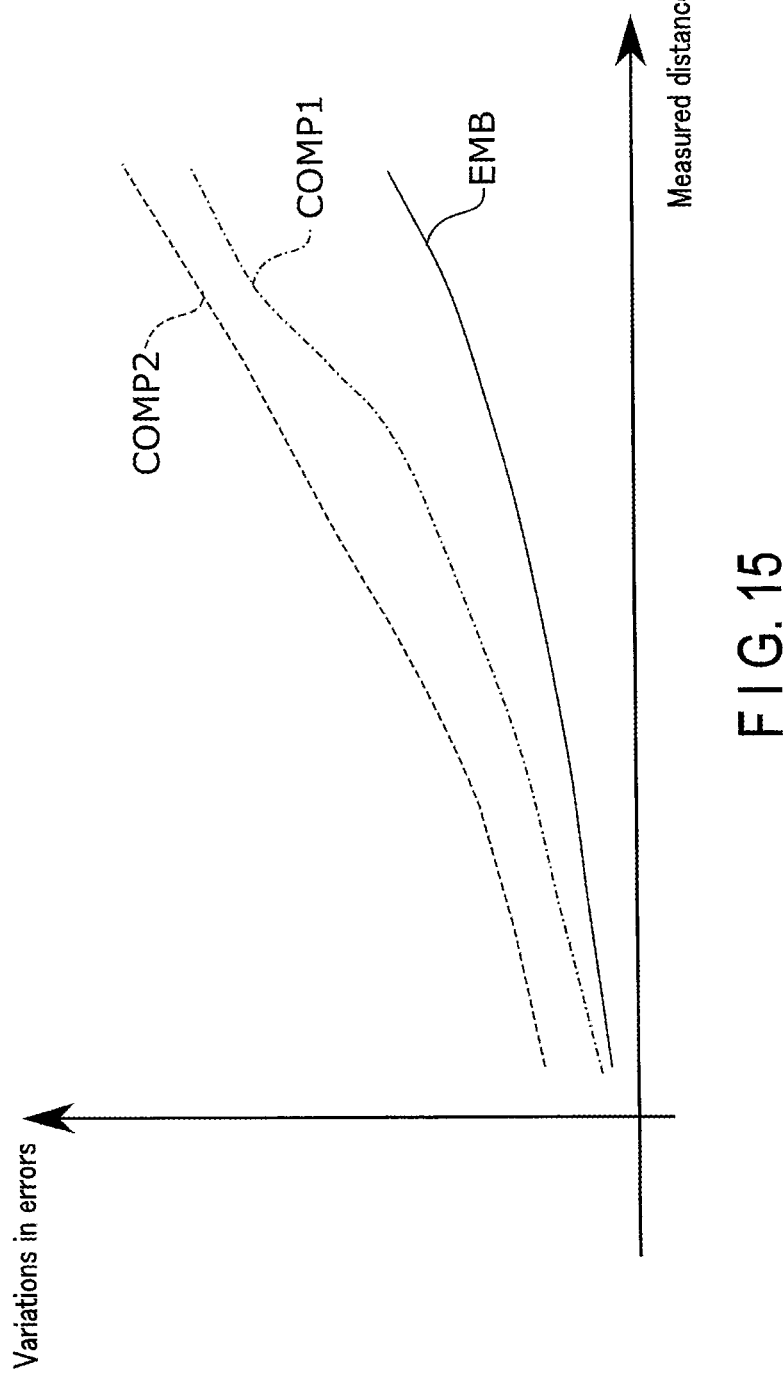
F I G. 15

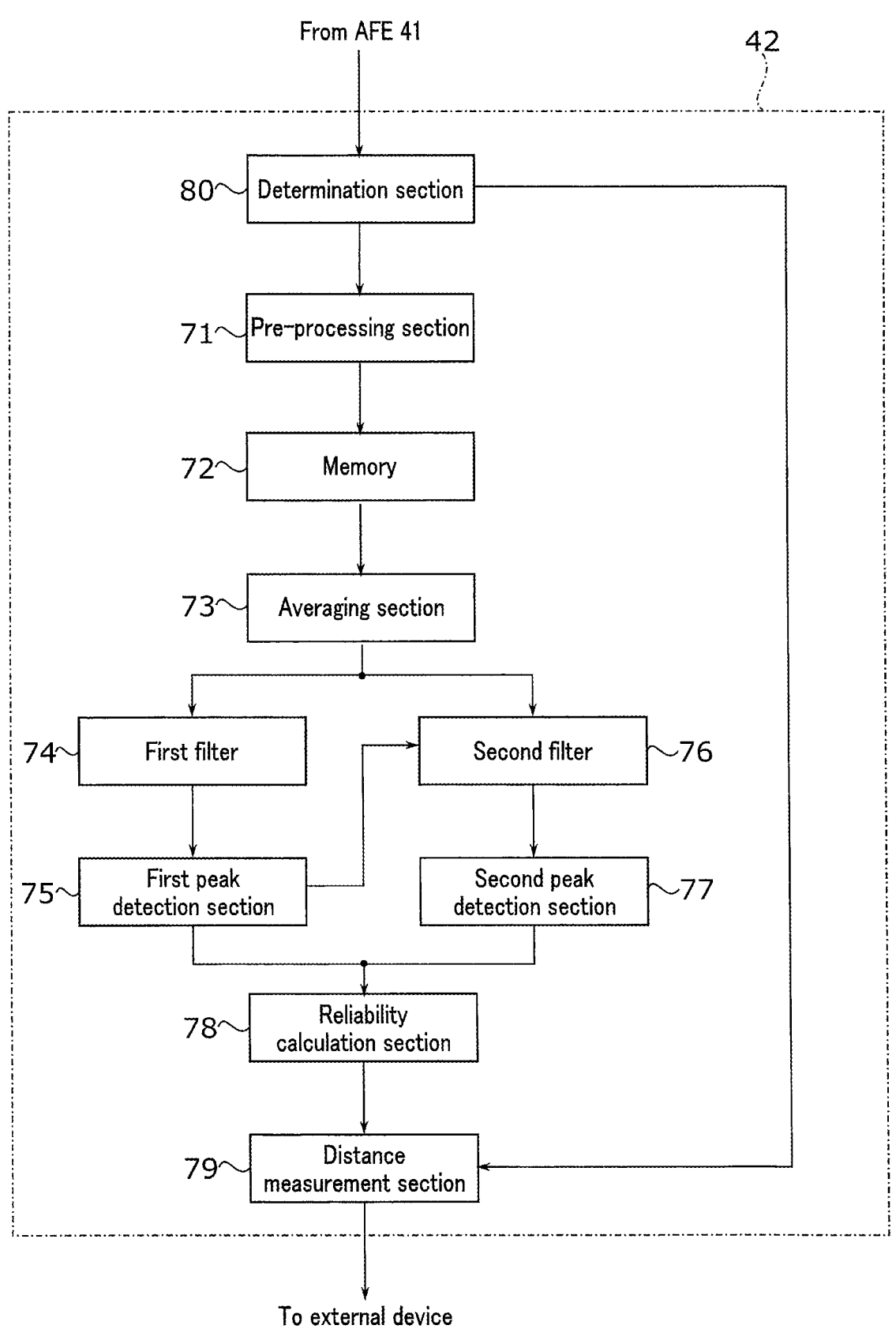
From AFE 41
42
80~ Determination section
71~ Pre-processing section
72~ Memory
73~ Averaging section
74~ First filter          Second filter ~76
75~ First peak detection section          Second peak detection section ~77
78~ Reliability calculation section
79~ Distance measurement section
To external device
F I G. 16

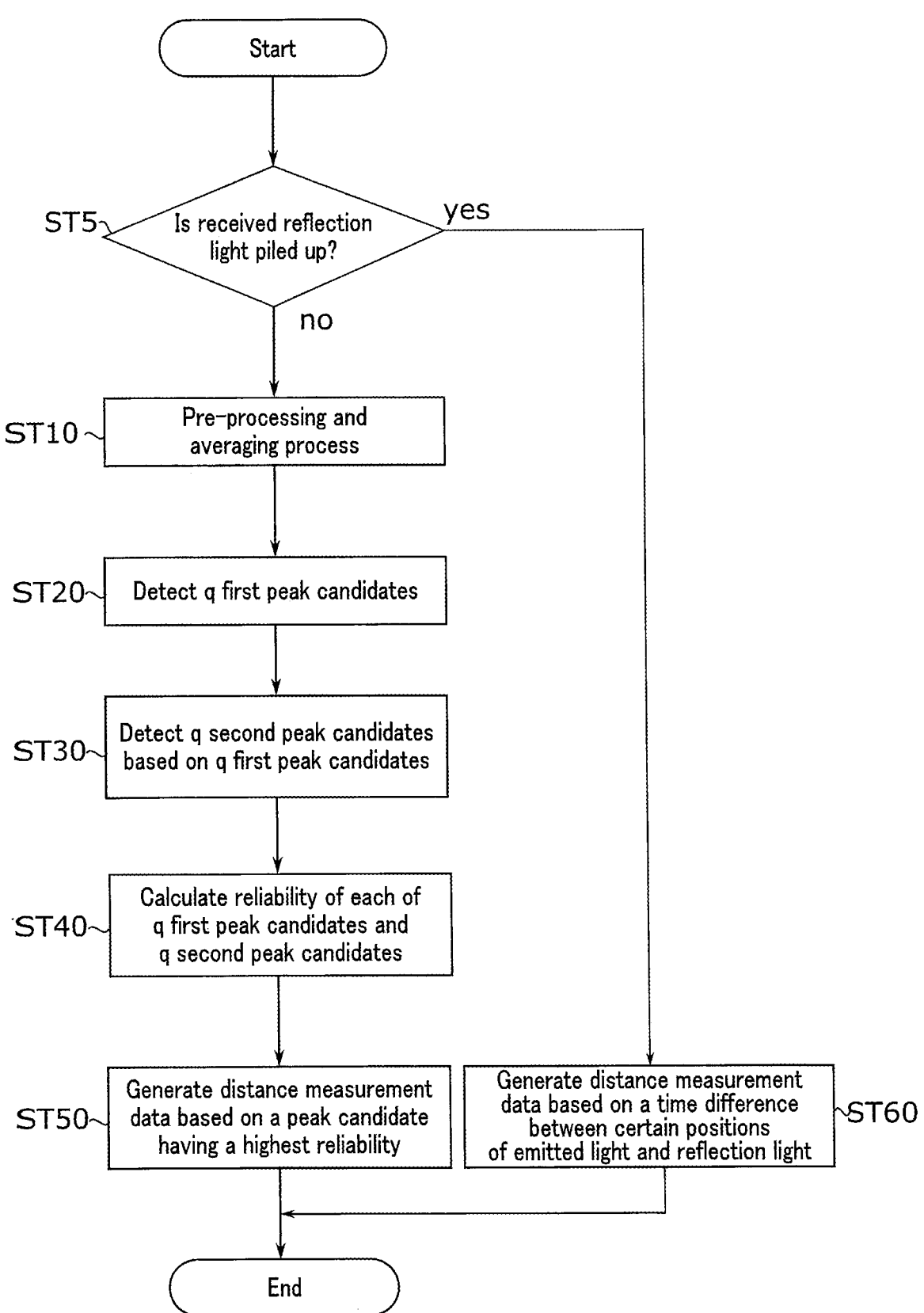
F I G. 17

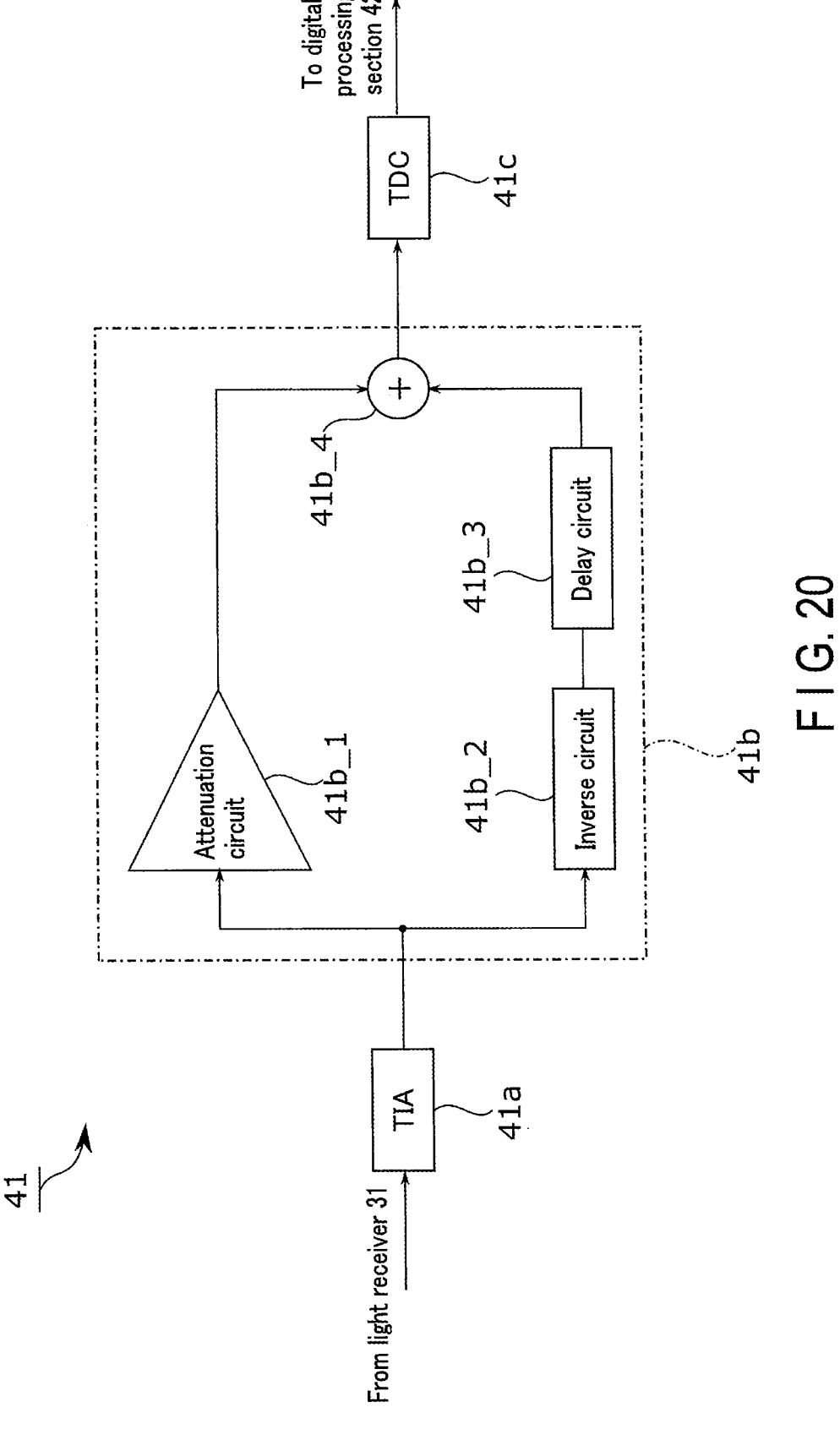
F I G. 20

DISTANCE MEASUREMENT DEVICE

CROSS-REFERENCE TO RELATED APPLICATIONS

This application is based upon and claims the benefit of priority from Japanese Patent Application No. 2020-152720, filed Sep. 11, 2020, the entire contents of which are incorporated herein by reference.

FIELD

Embodiments described herein relate generally to a distance measurement device.

BACKGROUND

A distance measurement device called LiDAR (light detection and ranging) is known. LiDAR illuminates a target with laser light and detects a strength of reflected light from the target with a sensor (light detector). LiDAR measures a distance to the target based on a change over time in a light intensity signal output from the sensor.

BRIEF DESCRIPTION OF THE DRAWINGS

FIG. 1 is a block diagram for explaining a configuration of a distance measurement device according to a first embodiment.

FIG. 3 is a circuit diagram for explaining a configuration of the light detector according to the first embodiment.

FIG. 4 is a circuit diagram showing a configuration of a pixel according to the first embodiment.

FIG. 5 is a schematic diagram showing a configuration example of an avalanche photodiode and an operation principle of a SPAD.

FIG. 6 is a block diagram for explaining a configuration of a digital processing section of the distance measurement device according to the first embodiment.

FIG. 8 is a schematic diagram for explaining a laser light scanning method in the distance measurement device according to the first embodiment.

FIG. 9 is a schematic diagram for explaining a laser light scanning method in the distance measurement device according to the first embodiment.

FIG. 10 is a schematic diagram for explaining a laser light scanning method in the distance measurement device according to the first embodiment.

FIG. 11 is a flowchart for explaining a distance measurement operation in the distance measurement device according to the first embodiment.

FIG. 12 is a diagram for explaining waveforms of various signals relating to a distance measurement operation in the distance measurement device according to the first embodiment.

FIG. 13 is a diagram for explaining an example of waveforms of output data from the first filter during a distance measurement operation in the distance measurement device according to the first embodiment.

FIG. 14 is a diagram for explaining an example of waveforms of output data from the first filter during a distance measurement operation in the distance measurement device according to the first embodiment.

FIG. 15 is a diagram for explaining effects according to the first embodiment.

FIG. 16 is a block diagram for explaining a configuration of a digital processing section of the distance measurement device according to a second embodiment.

FIG. 17 is a flowchart for explaining a distance measurement operation in the distance measurement device according to the second embodiment.

FIG. 20 is a block diagram for explaining a configuration of an AFE of a distance measurement device according to a modification of the second embodiment.

DETAILED DESCRIPTION

Figure 2:
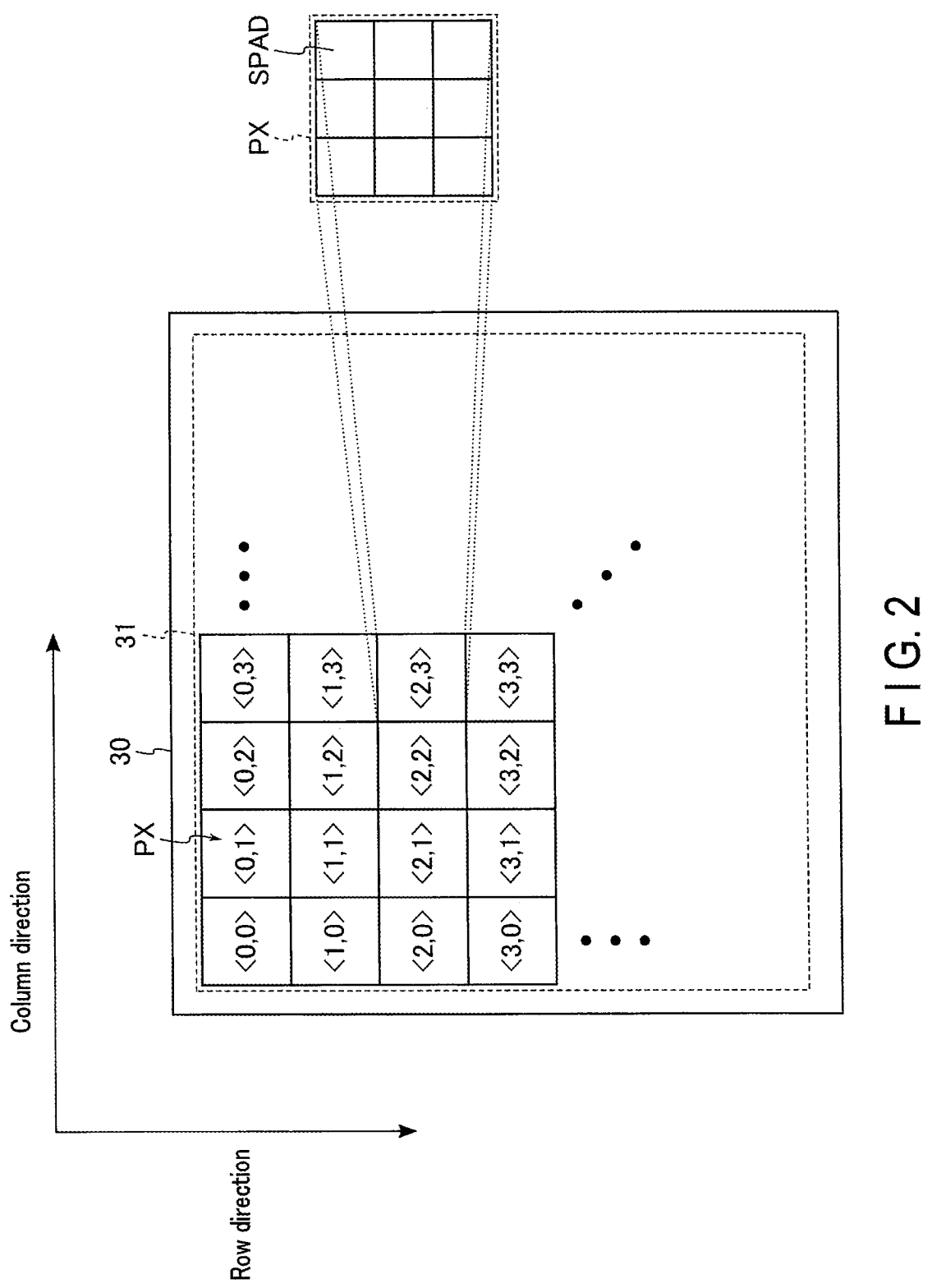
FIG. 2 is a plan view for explaining a planar layout of a light detector according to the first embodiment.

In general, according to one embodiment, a distance measurement device includes: a light source; an optical system configured to emit emission light from the light source and to receive reflected light of the emission light; a plurality of pixels configured to detect the received reflected light, each including at least one sensor, and arranged in a pixel area on a substrate; and a control circuit. The control circuit is configured to: identify first reflected light detected in a first pixel in association with first emission light; and measure a distance based on a time difference between the first emission light and the identified first reflected light. The first emission light includes a first pulse, second pulse, and third pulse in succession. A first interval between the first pulse and the second pulse differs from a second interval between the second pulse and the third pulse.

Hereinafter, embodiments will be described with reference to the drawings. In the descriptions below, constituent elements having the same functions and configurations will be denoted by the same reference symbols. If there is a need to distinguish constituent elements having the same reference numerals, additional symbols are appended to the reference numerals. If no distinction is necessary, the constituent elements are referred to by the same reference numerals only, and no additional symbols are appended.

1. First Embodiment

A distance measurement device according to a first embodiment is described. The distance measurement device according to the first embodiment is for example a LiDAR (light detection and ranging) device for measuring a distance to a target using laser light, and includes a light detector which is a photo-multiplier that can be integrated on a semiconductor substrate, particularly a silicon photo-multiplier (SiPM).

1.1 Configuration

Next, a configuration of the distance measurement device according to the first embodiment is described.

1.1.1 Distance Measurement Device

FIG. 1 is a block diagram for explaining a configuration of a distance measurement device according to the first embodiment.

As shown in FIG. 1, the distance measurement device 1 is configured to be capable of measuring a distance to a target TG. The distance measurement device 1 corresponds to a portion of an on-board system (not shown), for example. The target TG is a tangible object, such as a vehicle, a pedestrian, or an obstacle that is present in front of, behind, or on the side of a vehicle on which the distance measurement device 1 is installed.

The distance measurement device 1 includes an emission section 10, an optical system 20, a light detector 30, and a measurement processing section 40.

The emission section 10 generates and emits laser light L1 used by the distance measurement device 1 to measure a distance to the target TG. The emission section 10 includes, for example, an emission control section 11, drivers 12 and 13, and a light source 14.

The emission control section 11 generates an emission trigger based on, for example, a clock which serves as a reference for operations performed by the distance measuring apparatus 1. The emission trigger includes a pulse signal corresponding to an emission timing of the laser light L1 sent out to the target TG by the distance measurement device 1, and the trigger is transmitted to, for example, the drivers 12 and 13, the light detector 30, and the measurement processing section 40.

The driver 12 generates a drive current in accordance with an emission trigger from the emission control section 11 and supplies the generated drive current to the light source 14. In other words, the driver 12 functions as a current supply source for the light source 14.

The driver 13 generates a drive current in accordance with an emission trigger from the emission control section 11 and supplies the generated drive current to the mirror 22 in the optical system 20. In other words, the driver 13 functions as a current supply source for the mirror 22.

The light source 14 is a laser light source, such as a laser diode. The light source 14 intermittently produces (emits) the laser light L1 based on the drive current supplied from the driver 12. The laser light L1 is emitted on the target TG via the optical system 20, which is described later.

The optical system 20 emits the laser light L1 incident from the light source 14 onto the target TG and receives a reflected light L2 of the laser light L1 from the target TG. The optical system 20 includes a lens 21, a mirror 22, and a lens 23, for example.

The lens 21 is arranged on a light path of the laser light L1 emitted from the light source 14. The lens 21 collimates the laser light L1 passing through the lens 21 and guides the laser light L1 to the mirror 22.

The mirror 22 is driven on a supply of a drive current from the driver 13 and reflects the laser light L1 incident from the lens 21. For example, the reflection surface of the mirror 22 is configured to be rotatable about a single axis or two intersecting axes. The laser light L1 reflected by the mirror 22 is emitted outside the distance measuring apparatus 1 toward the target TG.

The lens 23 collects light reflected by the target TG and guides the collected reflected light to the light detector 30. In other words, the lens 23 collects, to the light detector 30, external light including reflected light (laser light) L2, which is a reflection of the laser light L1 emitted from the distance measurement device 1.

The laser lights L1 and L2 may form separate light paths between the distance measurement device 1 and the target TG as shown in FIG. 1, or may form the same light path, unlike the example of FIG. 1. In other words, the distance measurement device 1 may have a non-coaxial optical system in which the optical axis of the laser light L1 emitted from the light emission section 10 and the optical axis of the laser light L2 received by the light detector 30 differ from each other, or may have a coaxial optical system in which those two optical axes match.

The light detector 30 includes, for example, a light receiver 31 in which a plurality of pixels are arranged in a pixel area of a two-dimensional array which is defined by rows and columns. The light detector 30 selects, for each emission trigger, a portion of the pixels in the light receiver 31 as a light receiving area based on an emission trigger received from the emission control section 11.

The light receiver 31 receives the light L2 incident via the lens 23. Then, the light receiver 31 generates electric signals (analog signals) based on the intensity of the received reflected light L2 and outputs the analog signals to the measurement processing section 40 in units of pixels. In a period of a single distance measurement operation, the light receiver 31 receives multiple (for example, three) pulses of the laser light L2. For this reason, the light receiver 31 generates a single analog signal including multiple laser light L2 pulses and outputs the signal to the measurement processing section 40 in the period of a single distance measurement operation. The details of the light detector 30 will be described later.

After converting the analog signals received from the light detector 30 in units of pixels into digital signals, the measurement processing section 40 measures a distance between the distance measurement device 1 and the target TG based on the digital signals. Specifically, the measurement processing section 40 includes an analog front end (AFE) 41 and a digital processing section 42, for example.

The AFE 41 includes a trans-impedance amplifier (TIA), an analog-to-digital converter (ADC), and a time-to-digital converter (TDC), for example. The AFE 41 amplifies the analog signals input from the light detector 30 then converts the amplified analog signals into digital signals. The AFE 41 transmits the generated digital signals to the digital processing section 42.

The digital processing section 42 obtains an emission timing of the laser light L1 based on the emission trigger received from the emission control section 11, and an incidence timing of the reflected light L2 based on the digital signals received from the AFE 41. The digital processing section 42 calculates a time of flight of each of the laser light L1 and the reflected light L2 based on the above emission timing and incidence timing. The digital processing section 42 then measures a distance between the distance measurement device 1 and the target TG based on the time of flight and velocity of the laser light. The incidence timing of the reflected light L2 may be determined based on either a time of rise of the digital signals or a peak time of the digital signals. Such a distance measuring method may be called a time of flight (ToF) method.

The digital processing section 42 transmits the measured distance measurement data to an image processing circuit (not shown) of a subsequent stage. The image processing circuit of a subsequent stage generates, based on the distance measurement data, image data in which distance information is mapped over a region targeted for the measurement by the distance measurement device 1, for example. The generated image data is referred to by a control program of a vehicle, etc. equipped with the distance measurement device 1, for example.

With such a configuration, the distance measurement device 1 can measure a distance to a target TG.

1.1.2 Light Detector

Next, a configuration of the light detector according to the first embodiment will be described.

Planar Layout

FIG. 2 is an example of a planar layout of the light detector according to the first embodiment.

As shown in FIG. 2, for example, on a semiconductor substrate the light receiver includes a plurality of pixels PX arranged in a two-dimensional array extending in the row and column directions. The plurality of pixels PX are arranged in such a manner that each of their positions is identifiable by a column address associated with the column direction and a row address associated with the row direction.

In the example shown in FIG. 2, in the light receiver 31, the pixel PX which is the i-th on the row direction and the j-th on the column direction is indicated as pixel PX<i,j> ($0 \leq i \leq M$, $0 \leq j \leq N$, and M and N are discretionarily determined integers). In the following, for the sake of description, assume that a plurality of pixels PX<i> at the i-th order along the row direction correspond to a row address <i>, and a plurality of pixels PX<j> at the j-th order along the column direction correspond to a column address <j>.

Each of the pixels PX includes at least one photomultiplier element. As a photomultiplier element, a single-photon avalanche diode may be used for example. Hereinafter, a single-photon avalanche diode may be abbreviated as "SPAD". The details of the function of the SPAD will be described later. In a case where multiple SPADs are provided in a pixel PX, the multiple SPADs are arranged within the pixel PX in a two-dimensional array extending in the row and column directions, for example. The pixel PX that includes multiple SPADs may be called a silicon photomultiplier (SiPM).

The number of pixels PX and the number of SPADs included in the light detector 30 are not limited to those shown in FIG. 2, and the numbers can be discretionarily determined. The planar shape of each of the pixel PX and the SPAD may not necessarily be a square. The shape of the pixel PX may vary in accordance with the shape and arrangement of the SPADs included in each pixel PX. For example, in each pixel PX, the number of SPADs arranged in the row direction and the number of SPADs arranged in the column direction may differ from each other. The light detector 30 may use pixels PX in different shapes. A SPAD may be in a shape other than the shape shown in FIG. 2, for example a rectangle.

Circuit Configuration of Light Detector

Next, a circuit configuration of the light detector according to the first embodiment will be described.

FIG. 3 is a circuit diagram showing a configuration of the light detector according to the first embodiment.

FIG. 3 shows six pixels in the light receiver, PX<m,n−1>, PX<m,n>, PX<m,n+1>, PX<m+1,n−1>, PX<m+1,n>, and PX<m+1,n+1>, and a group of select lines that may be coupled to the six pixels PX ($0 \leq m \leq M-1$, $1 \leq n \leq N-1$).

As shown in FIG. 3, all pixels PX are associated with respective sets of a row select line row_sel and a column select line col_sel. In other words, a first end and a second end of a discretionarily chosen pixel PX are coupled to a corresponding row select line row_sel and a corresponding column select line col_sel, respectively. Thus, a specific pixel PX can be selected through selecting a set of a row select line row_sel and a column select line col_sel.

Specifically, the first ends of the pixels PX<m> ( . . . , PX<m,n−1>, PX<m,n>, PX<m,n+1>, . . . ) corresponding to the row address <m> are coupled in common to the row select line row_sel<m>. Similarly, the first ends of the pixels PX<m+1> ( . . . , PX<m+1,n−1>, PX<m+1,n>, PX<m+1, n+1>, . . . ) corresponding to the row address <m+1> are coupled in common to the row select line row_sel<m+1>.

The second ends of the pixels PX<n−1> ( . . . , PX<m, n−1>, PX<m+1,n−1>, . . . ) corresponding to the column address <n−1>are coupled in common to the column select line col_sel<n−1>. Similarly, the second ends of the pixels PX<n> ( . . . , PX<m,n>, PX<m+1,n>, . . . ) corresponding to the column address <n> are coupled in common to the column select line col_sel<n>. The second ends of the pixels PX<n+1> ( . . . , PX<m,n+1>, PX<m+1,n+1>, . . . ) corresponding to the column address <n+1>are coupled in common to the column select line col_sel<n+1>.

Circuit Configuration of Light Receiver

Next, a circuit configuration of the light receiver according to the first embodiment will be described.

FIG. 4 shows an example of a circuit configuration of the pixels of the light receiver according to the first embodiment. FIG. 4 shows a circuit configuration of the pixel PX<m,n> as an example.

As shown in FIG. 4, a pixel PX<m,n> includes a plurality of SPADs and transistors Tr1, Tr2, Tr3, and Tr4, for example. Each of the SPADs includes an avalanche photodiode APD and a quench resistor Rq. For example, the transistors Tr1 and Tr2 are n-type MOS transistors, and the transistors Tr3 and Tr4 are p-type MOS transistors.

The plurality of SPADs are coupled in parallel between a high-potential node NO and a low-potential power supply node SUB. Furthermore, for each of the SPADs, the avalanche photodiode APD and the quench resistor Rq are coupled in series between the high-potential node NO and the low-potential power supply node SUB. Specifically, an anode of the avalanche photodiode APD is coupled to the low-potential power supply node SUB. A cathode of the avalanche photodiode APD is coupled to one end of the quench resistor Rq. The other end of the quench resistor Rq is coupled to the high-potential node NO.

In the distance measurement operation in the distance measurement device 1, the potential of the high-potential node N0 is higher than the voltage applied to the low-potential power supply node SUB. In other words, a reverse bias is applied to the avalanche photodiodes APD in the distance measurement operation. The high-potential node N0 corresponds to an output end of a light detection result obtained by the avalanche photodiodes APD included in the SPADs.

The transistor Tr1 includes a first end coupled to the node N0, a second end to which a voltage VSS is supplied, and a control end coupled to the row select line row_sel<m>. The transistor Tr2 includes a first end coupled to the node N0, a second end to which a voltage VSS is supplied, and a control end coupled to the column select line col_sel<n>. The voltage VSS is a voltage lower than the high-potential node N0 and higher than the low-potential power supply node SUB, for example −5 V. This voltage value is only an example, and the voltage VSS may be a ground voltage, for example 0 V.

The transistor Tr3 includes a first end coupled to the node N0, a second end coupled to a first end of the transistor Tr4, and a control end coupled to the row select line row_sel<m>. The transistor Tr4 includes a second end coupled to an output node OUT<m,n> and a control end coupled to the column select line col_sel<n>.

With the above-described configuration, when both of the row select line row_sel<m> and the column select line col_sel<n> are selected, an output signal IOUT corresponding to a light detection result in multiple SPADs included in the pixel PX<m,n> can be output to the output node OUT<m,n>. When at least one of the row select line row_sel<m> or the column select line col_sel<n> is not selected, an output signal IOUT can be discharged, without being output from the output node OUT<m,n>.

The circuit configuration of the pixel PX is not limited to the above-described configuration. For example, the quench resistor Rq may be replaced with a transistor. A transistor for quenching may be further coupled to the high-potential node N0. The transistors Tr1 through Tr4 may be replaced with other switching elements as long as they can selectively output an output signal IOUT.

1.1.3 SPAD

In the following, an example of a configuration of the avalanche photodiode APD and an operation principle of the SPAD will be described with reference to FIG. 5. FIG. 5 schematically shows a configuration example of the avalanche photodiode APD and an operation principle of the SPAD.

First, the configuration of the avalanche photodiodes comprising APD is described. The avalanche photodiode APD includes, for example, a substrate 90, a p-type semiconductor layer 91, a p+-type semiconductor layer 92, and an n+-type semiconductor layer 93.

The substrate 90 is a p-type semiconductor substrate, for example. On the substrate 90, the p-type semiconductor layer 91, the p+-type semiconductor layer 92, and the n+-type semiconductor layer 93 are stacked in this order. The concentration of the p-type impurities in the p+-type semiconductor layer 92 is higher than that of the p-type impurities in the p-type semiconductor layer 91. The n+-type semiconductor layer 93 is a semiconductor doped with the n-type impurities. For example, on the n+-type semiconductor layer 93, an electrode (not shown) is coupled.

Next, an operation principle of the SPAD is described. In the distance measurement device 1 according to the first embodiment, the substrate 90 side corresponds to the low-potential power supply node SUB, and the n+-type semiconductor layer 93 corresponds to the high-potential side (cathode).

In the distance measurement operation of the distance measurement device 1, a negative high voltage is applied to the substrate 90 side of the avalanche photodiodes APD. In other words, a high reverse bias is applied to the avalanche photodiode APD and a strong electric field is produced between the p+-type semiconductor layer 92 and the n+-type semiconductor layer 93 ((1) of FIG. 5). On the other hand, in the vicinity of the junction between the p+-type semiconductor layer 92 and the n+-type semiconductor layer 93 (namely, a p-n junction) area, a depletion layer is formed (as shown in (2) of FIG. 5). In the distance measurement operation, the avalanche photodiode APD in this state is, in turn, in a state in which the APD is capable of detecting optical signals.

Then, the avalanche photodiode APD is illuminated with light, and optical energy partially arrives to the depletion layer ((3) of FIG. 5). When the depletion layer is illuminated with light, pairs of an electron and an electron hole, namely carriers, may be generated in the depletion layer ((4) of FIG. 5). The carriers generated in the depletion layer drift under the influence of the electric field of the reverse bias applied to the avalanche photodiode APD ((5) of FIG. 5). For example, the electron holes of the generated carriers are accelerated toward the substrate 90 side. On the other hand, the electrons among the generated carriers are accelerated toward the n+-type semiconductor layer 93.

The electrons accelerated toward the n+-type semiconductor layer 93 collide with the atoms under the influence of the strong electric field produced in the vicinity of the p-n junction. Then, the electrons that collided with the atoms ionize the atoms and generate new electron/electron hole pairings. When the voltage of the reverse bias applied to the avalanche photodiodes APD exceeds a breakdown voltage of the avalanche photodiodes APD, such generation of pairs of an electron and an electron hole is repeated. This phenomenon is called avalanche breakdown ((6) of FIG. 5(6)).

When avalanche breakdown occurs, the avalanche photodiodes APD discharge the electricity ((7) of FIG. 5). In the case of SPADs, the discharge does not stop unless some countermeasure is taken. Such discharge is called "Geiger discharge". When Geiger discharge occurs, a current flows through the output node of the SPAD. As a result, electric signals related to the Geiger discharge and recovery thereafter are output from the avalanche photodiode APD, namely one SPAD.

The current output from the avalanche photodiode APD flows in the quench resistor Rq, for example. As a result, the voltage drop occurs in the output node of the SPAD ((8) of FIG. 5). Such a voltage drop in a SPAD is called quenching. When the voltage of the reverse bias applied to the avalanche photodiodes APD becomes lower than the breakdown voltage due to the voltage drop, the Geiger discharge stops. Then, the capacity in the p-n junction in each avalanche photodiode APD is charged and a recovery current then flows. After some period of time has elapsed since the Geiger discharge stopped and the avalanche phenomenon ceased, the avalanche photodiode APD returns to a state of being able to detect a next light.

Thus, the light receiver 31 of the distance measurement device 1 according to the first embodiment has avalanche photodiodes APD used in a Geiger mode. These avalanche photodiodes APD experience avalanche breakdown in accordance with an incidence of light and output electric signals corresponding to a light detection result. It is thereby possible for the light receiver 31 to detect a receipt of light in units of photons and convert the light into electric signals.

The structure of the avalanche photodiodes APD used in a SPAD unit SU is not limited to that described in the above. For example, the p+-type semiconductor layer 92 may be omitted. The thickness of each of the p-type semiconductor layer 91, the p+-type semiconductor layer 92, and the n+-type semiconductor layer 93 may be changed as appropriate. The p-n junction of each avalanche photodiode APD may be formed in the vicinity of the boundary to the substrate 90. In the structure of each avalanche photodiode APD, the position of the p-type semiconductor layer and the n-type semiconductor layer may be reversed.

1.1.4 Configuration of Digital Processing Section

Next, a configuration of the digital processing section according to the first embodiment will be described.

FIG. 6 is a block diagram showing a configuration of a digital processing section of the distance measurement device according to the first embodiment.

As shown in FIG. 6, time-series data of an analog signal of each pixel PX that is output from the light receiver 31 is converted into a digital signal by the AFE 41 and then input. The digital processing section 42 includes a preprocessing section 71, a memory 72, an averaging section 73, a first filter 74, a first peak candidate detection section 75, a second filter 76, a second peak candidate detection section 77, a reliability calculation section 78, and a distance measurement section 79.

The preprocessing section 71 includes, for example, a finite impulse response (FIR) filter and a bit shifter, and performs pre-processing on a digital signal that is input from the AFE 41. Specifically, the preprocessing section 71 shapes a digital signal by the FIR filter. Then, the preprocessing section 71 reduces a digit of a signal value, which is increased as a result of the processing by the FIR filter, by the bit shifter. It is thereby possible to inhibit the increase of a memory capacity required for data storage and shape a plurality of pulse components of a digital signal at the same time. The data generated by the preprocessing section 71 is stored in the memory 72.

The memory 72 independently stores the data generated by the preprocessing section 71 for pixels PX adjacent in a pixel area. The memory 72 first stores time-series sampling data that is output by the ADC of the AFE 41, which is related to a single measurement (measurement for a single pixel). The memory 72 stores environmental light data received during a laser light L2 receiving period corresponding to the data from the preprocessing section 71, peak values of averaged data generated by the averaging section 73 (described later), etc., which are associated with the data generated by the preprocessing section 71. The memory 72 outputs data corresponding to a pixel targeted for a distance measurement operation to the averaging section 73, together with data corresponding to multiple pixels adjacent to the targeted pixel.

The averaging section 73 performs a process of averaging or accumulating (hereinafter "averaging process") data corresponding to a pixel targeted for a distance measurement operation using multiple sets of data corresponding to pixels in the vicinity of the targeted pixel. By the averaging process, a noise component included in the data included in the target pixel can be reduced with respect to a signal component. The averaging section 73 sends the generated averaged data to the first filter 74 and the second filter 76 as input data FIRIN.

The first filter 74 is a FIR filter, for example, and has a filter function F which outputs data that has a highest peak at a time corresponding to a predetermined pulse signal among multiple pulse signals in the input data FIRIN that is input from the averaging section 73. The first filter 74 performs filtering on the input data FIRIN using the filter function F over an entire sampling time, and generates output data FIR1OUT. The first filter 74 outputs the generated output data FIR1OUT to the first peak candidate detection section 75.

The first peak candidate detection section 75 searches for the output data FIR1OUT, and detects sampling times corresponding to q predetermined peaks from the output data FIR1OUT as the first peak candidates. A discretionarily chosen natural number is adoptable as q; for example, q may be set to 2. The first peak candidate detection section 75 transmits the detected q first peak candidates to the second filter 76 and the reliability calculation section 78.

The second filter 76 is a FIR filter, and has the same filter function F as the first filter 74 for example. The second filter 76 performs filtering on the input data FIRIN using the filter function F and generates output data FIR2OUT. The first filter 74 performs filtering on the input data FIRIN for the entire sampling time, whereas the second filter 76 selectively performs filtering on the input data FIRIN for time areas in the vicinity of each of the q first peak candidates received from the first peak candidate detection section 75. The second filter 76 outputs the generated output data FIR2OUT to the second peak candidate detection section 77.

The second peak candidate detection section 77 searches for the output data FIR2OUT, and detects sampling times corresponding to the same number of first peak candidates (namely, q) from the output data FIR2OUT as the second peak candidates. Specifically, the second peak candidate detection section 77 detects, as a second peak candidate, a sampling time at which the value of the output data FIR2OUT becomes maximum in the vicinity of each of the q first peak candidates. The second peak candidate detection section 77 transmits the detected q second peak candidates to the reliability calculation section 78.

The reliability calculation section 78 calculates, based on the q first peak candidates received from the first peak candidate detection section 75 and the q second peak candidates received from the second peak candidate detection section 77, a reliability of the input data FIRIN at the sampling times detected as the 2q peak candidates. When calculating a reliability, the reliability calculation section 78 takes into account, for example, a consistency with the input FIRIN in neighboring pixels PX of pixels PX targeted for a distance measurement operation corresponding to the input data FIRIN. In other words, the reliability calculation section 78 calculates a higher reliability for, among the 2q peak candidates, a peak candidate corresponding to a sampling time at which a high reliability has been calculated in neighboring pixels PX. The reliability calculation section 78 extracts a peak candidate having a highest reliability as a true peak candidate based on the calculated reliability of each peak candidate, and transmits the sampling time of this true peak to the distance measurement section 79.

The distance measurement section 79 measures a distance between the distance measurement device 1 and the target object TG based on the sampling time of the true peak received from the reliability calculation section 78 and the emission trigger received from the emission control section 11, and generates distance measurement data. The distance measurement section 79 transmits the generated distance measurement data to an external image processing circuit.

Figure 7:
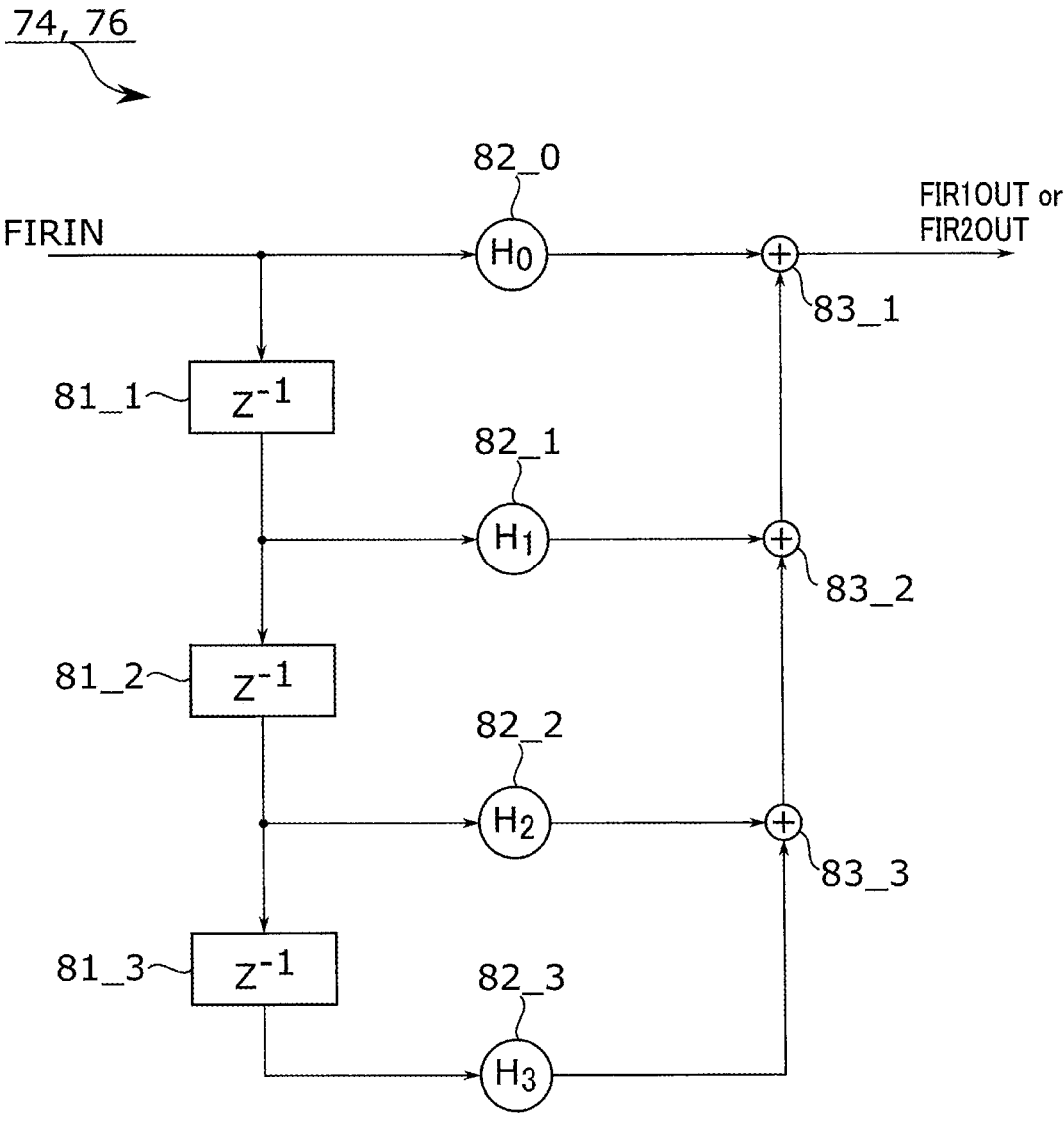
FIG. 7 is a block diagram for explaining a hardware configuration of a first filter and a second filter of the distance measurement device according to the first embodiment.

FIG. 7 is a block diagram showing a hardware configuration of a first filter and a second filter of the distance measurement device according to the first embodiment.

As shown in FIG. 7, each of the first filter 74 and the second filter 76 is realized as hardware with, for example, the configuration shown in FIG. 7. Specifically, each of the first filter 74 and the second filter 76 includes three registers 81 (81_1, 81_2, 81_3), four multipliers 82 (82_0, 82_1, 82_2, 82_3) and three adders 83 (83_1, 83_2, 83_3).

Each of the registers 81_1 to 81_3 has a function of storing data of a cycle (sampling time) immediately before the data supplied to its input terminal. Specifically, the register 81_1 has an input terminal to which the input data FIRIN is supplied and an output terminal coupled in common to an input terminal of the register 81_2 and an input terminal of the multiplier 82_1. The register 81_2 has an output terminal coupled in common to an input terminal of the register 81_3 and an input terminal of the multiplier 82_2. The register 81_3 has an output terminal coupled to ans input terminal of the multiplier 82_3.

Each of the multipliers 82_0 to 82_3 has function of amplifying or multiplying the data supplied to the input terminal with predetermined coefficient and outputting the data to the output terminal. Specifically, The coefficients H0 to H3 are set to the multipliers 82_0 to 82_3, respectively. The multiplier 82_0 has an input terminal to which the input data FIRIN is supplied and an output terminal coupled to a first input terminal of the adder 83_1. For example, "1" is set as the coefficient H0 of the multiplier 82_0. The multiplier 82_1 has an output terminal coupled to a first input terminal of the adder 83_2. For example, "1" is set as the coefficient H1 of the multiplier 82_0. The multiplier 82_2 has an output terminal coupled to a first input terminal of the adder 83_3. For example, "0" is set as the coefficient H2 of the multiplier 82_2. The multiplier 82_3 has an output terminal coupled to a second input terminal of the adder 83_3. For example, "1" is set as the coefficient H3 of the multiplier 82_3.

Each of the adders 83_1 to 83_3 has a function of outputting data to which the data supplied to the first input terminal and the data supplied to the second input terminal are added. Specifically, the adder 83_3 has an output terminal coupled to the second input terminal of the adder 83_2. The adder 83_2 has an output terminal coupled to the second output terminal of the adder 83_1. The adder 83_1 has an output terminal that outputs the output data FIR1OUT or FIR2OUT.

With such configurations, the output data FIR1OUT and FIR2OUT are determined by three cycles of the input data FIRIN.

In reality, the processing performed by the configuration shown in FIG. 6 (including FIG. 7) is performed in parallel based on a pipeline. Specifically, another memory 72 is provided in addition to the number of memories 72 required for the averaging process. Thus, read and write operations in the memory 72 are processed in parallel in the same pipeline stage. Herein, in a case where four pixels are accumulated in a column direction as an averaging process, for example, the number of memories 72 required by the averaging process is four. In other words, when the number of memories 72 required by the averaging process is four, the total number of memories 72 is five. Hereinafter, five memories 72 will be referred to as memory 72_1, 72_2, 72_3, 72_4, and 72_5 for distinction.

When data of a pixel is stored in the memory 72_1, data of a next pixel is stored in the memory 72_2. Similarly, pixel data is stored in the memory 72_3 after memory 72_2, in the memory 72_4 after the memory 72_3, then in the memory 72_5 after the memory 72_4. After the memory 72_5, pixel data is then stored in the memory 72_1. Thus, the memories 72_1 to 72_5 are used in a cyclic manner.

In the averaging process, a smart accumulation technique (SAT) may be used. With the SAT, of data of pixels in the vicinity, data of pixels whose similarity between an intensity of environmental light and a peak size is weak is not accumulated. The data of the environmental light and the peaks are stored in the memory 72 in the present embodiment. With the SAT, it is possible to select reflected light from the same target and exclude reflected light from the other target (noise). In the present embodiment, since multiple pulses are used, as will be described later, a period of time during which signals are received is long, and this increases the probability that reflected light from other targets will overlap; however, with the SAT, it is possible to eliminate the influence of the reflected light from other targets. The SAT is described in U.S. Patent Application Publication No. 2017/0363740 (U.S. patent application Ser. No. 15/625,138), for example. The entire contents of this patent application are incorporated herein by reference.

1.2 Operation

Next, operations of the distance measurement device according to the first embodiment will be described.

1.2.1 Scan Operation

First, an example of a scanning laser light L1 in the distance measurement device according to the first embodiment is described. FIGS. 8-10 show methods of emitting laser light L1 in cases where different scanning methods are adopted for a target object TG.

In the example of FIG. 8, the distance measurement device 1 scans in the rightward direction of the drawing sheet then turn backs and scans in the leftward direction, and then turn backs and scans in the rightward direction. The distance measurement device 1 performs such reciprocating scanning. As a means of realizing the above-described scanning, a double-axis mirror may be used for example.

In the example of FIG. 9, with an addition of a laser light source having a vertically thin light emitting surface and/or a cylindrical lens, the distance measurement device 1 simultaneously emits laser light L1 on a series of portions in a vertical direction of a target TG and slides the laser light L1 in the rightward direction of the drawing sheet. As a means of realizing the above-described scanning, a rotational mirror or a single-axis mirror may be used. The distance measurement device 1 may be simply rotated, without using a mirror.

In the example of FIG. 10, the distance measurement device 1 performs a scanning operation several times at different locations in a vertical direction, sliding laser light L1 in the lateral direction, and in the scanning operation, laser light L1 is simultaneously emitted on a portion of the target TG corresponding to multiple pixels in a vertical line using a laser light source having a vertically thin light emitting surface and/or an aspherical collimator lens having anisotropy. As a means of realizing such scanning, for example, a polygon mirror having different tilt angles, a rotational mirror, or a double-axis mirror, etc., may be used.

While the scanning method illustrated above is a mechanical method, an optical phased array (OPA) method is also known as a different way of scanning. Advantageous effects achieved by the distance measurement device 1 according to the first embodiment do not depend on a light scanning method. For this reason, the distance measurement device 1 according to the first embodiment may perform scanning of laser light L1 using either a mechanical method or an OPA method. In the following, for the sake of brevity, a case where the distance measurement device 1 performs scanning of laser light L1 using the method shown in FIG. 8 is described.

1.2.2 Distance Measurement Operation

Next, a distance measurement operation in the distance measurement device according to the first embodiment is described.

Flowchart

FIG. 11 is a flowchart showing a distance measurement operation in the distance measurement device according to the first embodiment.

As shown in FIG. 11, in step ST10, the preprocessing section 71, the memory 72, and the averaging section 73 perform preprocessing and averaging on a digital signal that is output from the AFE 41 and generates input data FIRIN. The averaging section 73 sends the generated input data FIRIN to the first filter 74 and the second filter 76.

In step ST20, the first filter 74 performs filtering on the input data FIRIN using the filter function F over the entire sampling time, and generates output data FIR1OUT. The first peak candidate detection section 75 searches the output data FIR1OUT to detect q first peak candidates. The first peak candidate detection section 75 transmits the q detected first peak candidates to the second filter 76 and the reliability calculation section 78.

In step ST30, the second filter 76 performs filtering on the input data FIRIN using the filter function F over the vicinity of each of the q first peak candidates, and generates output data FIR2OUT. The second peak candidate detection section 77 searches the output data FIR2OUT to detect q second peak candidates respectively corresponding to the vicinities of q first peak candidates. The second peak candidate detection section 77 transmits the detected q second peak candidates to the reliability calculation section 78.

In step ST40, the reliability calculation section 78 calculates a reliability of each of q first peak candidates and q second peak candidates.

In step ST50, the reliability calculation section 78 transmits, to the distance measurement section 79, a time of a peak candidate having a highest reliability among the 2q peak candidates for which a reliability is calculated. The distance measurement section 79 regards the peak candidate having the highest reliability as a true peak, and generates distance measurement data based on this true peak.

After the operations as described above, the distance measurement operation is finished.

(Relationship between Laser Light L1 and Input Data FIRIN)

FIG. 12 is a diagram showing waveforms of various signals relating to a distance measurement operation in the distance measurement device according to the first embodiment. Specifically, FIG. 12(A) indicates a waveform of the laser light L1 used in a single distance measurement operation. FIG. 12(B) shows a waveform of "AFE output", which is a digital signal generated by converting, by the AFE 41, an analog signal of the laser light L2 received by the light receiver 31, in correspondence with the laser light L1 shown in FIG. 12(A). FIG. 12(C) shows input data FIRIN generated by the averaging section 73 based on an AFE output shown in FIG. 12(B).

First, the laser light L1 used in the distance measurement operation in the first embodiment is described with reference to FIG. 12(A).

As shown in FIG. 12(A), the light source 14 emits a first pulse of the laser light L1 at time t1 when a predetermined length of time has elapsed since reference time t0. Subsequent to time t1, the light source 14 emits second and third pulses at time t2 and time t3, respectively. Thus, in the first embodiment, three pulses are included in the laser light L1 used in a single distance measurement operation. Heights (brightness) of three consecutive pulses are set to be equal. Herein, three pulses "being consecutive" means that a pulse of the laser light L1 not used in a single distance measurement operation is not included in an interval between the first pulse and the second pulse or an interval between second pulse and the third pulse constituting the three pulses.

An interval between a first pulse and a second pulse and an interval between a second pulse and a third pulse are set in such a manner that the emission interval does not become uniform. Specifically, for example, the interval 2D between time t2 and time t3 is set to be double the interval D between time t1 and time t2, but does not necessarily have to be set to be double the interval. The interval D is set to be longer than a sum of a recovery response of a photomultiplier multiplied by a coefficient of a time constant (which is an integer equal to or greater than 1) and a pulse width, so that three pulses (especially the first and second pulses) can be distinguished in the light receiver 31. Generally, the interval D becomes longer than (a time-converted) distance measurement accuracy assumed in the distance measurement operation.

Specifically, the interval D between a first pulse and a second pulse may be set to be 30 nanoseconds, for example. In this case, the interval 2D between the second pulse and the third pulse may be set to be 60 nanoseconds, which is double the interval D, or to an interval shorter than 60 nanoseconds (for example 45 nanoseconds).

In a case where an amount of received light is large and the time constant of the recovery response is long, the interval D between the first pulse and the second pulse may be set within the range between 50 nanoseconds and 100 nanoseconds. In this case, the interval 2D between the second pulse and the third pulse may be set at a value obtained by adding a fixed length of time (e.g., 50 nanoseconds) to the length of the interval D between the first pulse and the second pulse. The pulse interval D in a case where an amount of received light is large does not vary with every distance measurement but is rather determined for a reason originating from a device.

Next, the AFE output corresponding to the laser light L1 and the input data FIRIN corresponding to the AFE output are explained with reference to FIG. 12(B) and FIG. 12(C).

As shown in FIG. 12(B), the light receiver 31 outputs an analog signal from an on-state pixel PX from time k0, which is a predetermined time Δt that has elapsed after the laser light L1, to time kf. The AFE 41 samples the analog signal from time k0 to time kf and converts it into a digital signal as an AFE output. The AFE output includes noise components due to environmental light, etc. in addition to the signal components corresponding to the laser light L1.

As shown in FIG. 12(C), as a result of the preprocessing and the averaging performed by the preprocessing section 71, the memory 72, and the averaging section 73, the noise components included in the AFE output are reduced in the input data FIRIN. It is thereby possible to reduce loads on the peak candidate detection in a subsequent peak candidate detection process.

When all three pulses are received by the light receiver 31, three peak-shaped signal components corresponding to the three pulses are included in AFE output and the input data FIRIN. The examples of FIGS. 12(B) and 12(C) show a case where all three pulses are received by the light receiver 31; however, all three pulses are not always received.

In the AFE output and the input data FIRIN, the heights (brightness) of three signal components corresponding to three pulses are not always equal. The interval 2D' between time k2 and time k3 may be roughly double, but not strictly double, the interval D' between time k1 and time k2. The value of the interval D' approximates that of the interval D but these values are not necessarily strictly equal.

Whereas time t0 to t3 and sampling time k0 and kf are known, time k1, k2, and k3 are unknown (although the sampling timing k1, k2, and k3 at which three pulses are respectively received are shown in FIGS. 12(B) and 12(C) for the sake of explanation) at the time of the AFE output, and the input data FIRIN are generated. In other words, in a subsequent distance measurement operation, identification (detection) of one of time k1, k2 and k3 and measurement of difference from one of corresponding time t1, t2, and t3 are performed.

In the descriptions hereinafter, a case where time k2 is identified in the input data FIRIN will be described as a specific example of a distance measurement operation. To simplify the explanation, assume that the interval D' in the input data FIRIN is equal to the interval D in the laser light L1.

First Peak Candidate Detection

As described above, the light receiver 31 is not always able to receive all three pulses of the laser light L1 emitted in a single distance measurement operation. For this reason, the input data FIRIN may include 0 to 3 peak-shaped signal components in accordance with the number of pulses received by the light receiver 31. For example, the first filter 74 performs filtering on the input data FIRIN in a range of k0+D≤k≤kf−2D using the filter function F shown below, and generates the output data FIR1OUT(k).

$$FIR1OUT(k)=F(FIRIN)=FIRIN(k-D)+FIRIN(k)+FIRIN(k+2D)$$

When the filter function F is used, an output value of the output data FIR1OUT(k) is amplified most at a time k2 corresponding to the second pulse. In other words, the output value at time k of the output data FIR1OUT obtained through the use of the filter function F indicates a probability that time k is time k2.

For this reason, the first peak candidate detection section 75 can detect q candidates with the highest probability that time k is time k2 by searching for a sampling time at which the output value of the output data FIR1OUT(k) is large within the range of k0+D≤k≤kf−2D.

FIGS. 13 and 14 are diagrams showing waveforms of output data from the first filter of the distance measurement device according to the first embodiment.

FIG. 13(A) shows the output data FIR1OUT in a case where the light receiver 31 detects all three pulses. FIGS. 13(B1) to (B3) show the output data FIR1OUT in a case where the light receiver 31 detects two pulses. Specifically, FIG. 13(B1) shows the output data FIR1OUT in a case where the light receiver 31 detects the second and third pulses of the three pulses. FIG. 13(B2) shows the output data FIR1OUT in a case where the light receiver 31 detects the first and third pulses of three pulses. Specifically, FIG. 13(B3) shows the output data FIR1OUT in a case where the light receiver 31 detects the first and second pulses of three pulses.

FIGS. 14(C1) to (C3) show the output data FIR1OUT in a case where the light receiver 31 detects one of three pulses. Specifically, FIG. 14(C1) shows the output data FIR1OUT in a case where the light receiver 31 detects only the third pulse of three pulses. FIG. 14(C2) shows the output data FIR1OUT in a case where the light receiver 31 detects only the second pulse of three pulses. FIG. 14(C3) shows the output data FIR1OUT in a case where the light receiver 31 detects only the first pulse of three pulses.

First, the case where the light receiver 31 detects all three pulses is described with reference to FIG. 13(A). As shown in FIG. 13(A), when the light receiver 31 detects all three pulses, a large peak corresponding to a sum of three signal components at times k1, k2, and k3 appears at time kx in the output data FIR1OUT(k). Further, a small peak corresponding to one of the signal components at times k1, k2, and k3 appears at times kx−3D, kx−2D, kx−D, kx+D, kx+2D, and kx+3D in the output data FIR1OUT(k).

For this reason, when the light receiver 31 detects all three pulses, the first peak candidate detection section 75 is able to detect time kx at which the largest peak appears and (q−1) times corresponding to (q−1) peaks having a large value of 6 small peaks, a total of q times, as candidates of time k2 (first peak candidates).

Next, the case where two of three pulses are detected by the light receiver 31 is explained with reference to FIGS. 13(B1) to 13(B3).

As shown in FIG. 13(B1), when the light receiver 31 detects the second and third pulses, a medium peak corresponding to a sum of two signal components at times k2 and k3 appears in the output data FIR1OUT(k) at time kx. Further, a small peak corresponding to the signal components at times k2 or k3 appears at four times, kx−2D, kx+D, kx+2D, and kx+3D in the output data FIR1OUT(k).

As shown in FIG. 13(B2), when the light receiver 31 detects the first and third pulses, a medium peak corresponding to a sum of two signal components at times k1 and k3 appears in the output data FIR1OUT at a time kx. Further, a small peak corresponding to the signal components at time k1 or k3 appears at four times, kx−3D, kx−D, kx+2D, and kx+3D in the output data FIR1OUT(k).

As shown in FIG. 13(B3), when the light receiver 31 detects the first and second pulses, a medium peak corresponding to a sum of two signal components at times k1 an k2 appears in the output data FIR1OUT at time kx. Further, a small peak corresponding to the signal components at time k1 or k2 appears at four times, kx−3D, kx−2D, kx−D, and kx+D in the output data FIR1OUT(k).

For this reason, when the light receiver 31 detects two of three pulses, the first peak candidate detection section 75 can detect time kx at which the medium peak appears and (q−1) times corresponding to (q−1) peaks having a large value of 4 small peaks, a total of q times, as candidates of time k2 (first peak candidates).

Thus, in the case where all three pulses of the laser light L1 are received and the case where two of three pulses are received, there is a time (=kx) at which a sum of signal components corresponding to multiple pulses is an output value in the output data FIR1OUT(k). For this reason, the first peak candidate detection section 75 detects, with a high probability, time k2 that needs to be truly detected (time kx in FIG. 13) as one of q first peak candidates.

Next, the case where one of three pulses are detected by the light receiver 31 is explained with reference to FIGS. 14(C1) to 14(C3).

As shown in FIG. 14(C1), when only the third pulse is detected by the light receiver 31, a small peak corresponding to the signal component at time k3 appears in the output data FIR1OUT(k) at three times, kx, kx+2D, and kx+3D.

As shown in FIG. 14(C2), when only the second pulse is detected by the light receiver 31, a small peak corresponding to a signal component at time k2 appears in the output data FIR1OUT(k) at times kx−2D, kx, and kx+D.

As shown in FIG. 14(C3), when only the first pulse is detected by the light receiver 31, a small peak corresponding to a signal component at time k1 appears in the output data FIR1OUT(k) at times kx−3D, kx−D, and kx.

For this reason, when the light receiver 31 detects one of three pulses, the first peak candidate detection section 75 can detect q times corresponding to q peaks having a large value of 3 small peaks as candidates of time k2 (first peak candidates).

However, in the case where one of three pulses of the laser light L1 is received, there is no time at which a sum of signal components corresponding to multiple pulses is an output value in the output data FIR1OUT(k). For this reason, there is a case where the first peak candidate detection section 75 cannot detect time k2 that needs to be truly detected (time kx in FIG. 14) from a plurality of peaks that appear in the output data FIR1OUT(k) as one of q first peak candidates. Furthermore, there is a case where, even when the first peak candidate detection section 75 detects time kx as one of the first peak candidates, the output value of the output data FIR1OUT at time kx may not be a maximum value of the output data FIR1OUT. In other words, there is a case where the first peak candidate detection section 75 does not detect time kx as a time most likely to be time k2.

Second Peak Candidate Detection

The second filter 76 and the second peak candidate detection section 77 has a function of detecting a time that needs to be truly detected as a second peak candidate in a case where the time that needs to be truly detected (=kx) cannot be detected in the first peak candidate detection section 75.

In a case where a filter function F equivalent to that set in the first filter 74 is set, the second filter 76 performs filtering on the input data FIRIN at six points in the vicinity of time kp (kp−3D, kp−2D, kp−D, kp+D, kp+2D, and kp+3D) for each of times kp (kp1, . . . , kpq) of the first peak candidates, and generates a total of 6q sets of the output data FIR2OUT.

For example, in FIG. 14(C3), in a case where the first peak candidate detection section 75 detects time kx−3D as a first peak candidate, the second filter 76 generates six data sets FIR2OUT(kx−6D), FIR2OUT(kx−5D), FIR2OUT(kx−4D), FIR2OUT(kx−2D), FIR2OUT(kx−D), and FIR2OUT(kx). Thus, even in a case where the first peak candidate detection section 75 detects a peak furthest (about 3D) from time kx that needs to be truly detected as a first peak candidate, the second filter 76 still can include time kx in the candidates for detecting second peak candidates. As the second peak candidates are peaks not detected as the first peak candidates, the brightness in the second peak candidates is necessarily smaller than the brightness in the first peak candidates.

The second peak candidate detection section 77 detects, as a second peak candidate, a time at which an output value becomes maximum among six sets of the output data FIR2OUT generated by the second filter 76 for each first peak candidate.

Through the above-described operation, even when time kx that needs to be truly detected is not included in the first peak candidates, the second peak candidate detection section 77 is able to detect time kx as a second peak candidate.

Reliability Calculation

As described above, when only one of three pulses of the laser light L1 is detected, a significantly large peak compared to other peaks does not appear in the output data FIR1OUT and FIR2OUT. In other words, when only one of three pulses of the laser light L1 is detected, it may be difficult to select a time most likely to be time k2 from the first and second peak candidates. On the other hand, there is a case where, even when only one pulse is received in a pixel PX, two or more pulses can be received in at least one pixel PX in the vicinity of that pixel PX.

The reliability calculation section 78 calculates a reliability of each of q first peak candidates and q second peak candidates based on the input data FIRIN of at least one pixel PX next to a pixel PX targeted for a distance measurement operation. Thus, the reliability calculation section 78 can, when a peak candidate consistent with the input data FIRIN relating to the neighboring pixel PX is a second peak candidate, set a higher reliability to this second peak candidate than to the other peak candidates including the first peak candidates.

The descriptions and the mathematical expressions in the sections "First Peak Candidate Detection" and "Second Peak Candidate Detection" express the processing in the first filters 74 and 76 according to the first embodiment in a purely functional manner. In reality, however, the processing is performed by hardware as shown in FIG. 7. For this reason, for example, output data FIR1OUT(k) cannot be determined when the process is performed at time k at which the input data FIRIN(k+2D) has not yet been input. In other words, in reality, the output data FIR1OUT(k) is output with a delay, after a point in time when the process corresponding to time k+2D is performed (namely after two cycles). This delay is realized by a time adjustment by storing of related data in a register as appropriate.

1.3 Advantageous Effects of Present Embodiment

According to the first embodiment, the emission control section 11 emits laser light L1 including three consecutive pulses in correspondence to a single distance measurement operation. The measurement processing section 40 identifies a reflected light L to the laser light L1 based on the reflected light L2 of the laser light L1 received by the light detector 30, and measures a distance between a target object TG and the distance measurement device 1. An interval between a first pulse and a second pulse differs from an interval between a second pulse and a third pulse. It is thereby possible to identify which pulse is lost in the case where some of the three pulses are lost in the reflected light L2 received by the light detector 30. For this reason, even in the case where the target object TG is at a sufficient distance from the distance measurement device 1 that a pulse included in the reflected light L2 may be lost (e.g., a few hundred meters), it is possible to identify the reflected light L2 for the laser light L1. Hereinafter, this advantageous effect is described with reference to FIG. 15.

FIG. 15 is a diagram showing advantageous effects according to the first embodiment. FIG. 15 shows lines EMB, COMP1, and COMP2, each line being a plot of variations in a measured distance in relation to a distance to the target object TG. The line EMB corresponds to a case where a distance is measured by the distance measurement device 1 according to the first embodiment, and lines COMP1 and COMP2 correspond to a case where a distance is measured by a distance measurement device according to a comparative example.

In the distance measurement device according to the line COMP1, a case where a distance is measured using a single pulse of laser light L1 emitted from the distance measurement device 1 according to the first embodiment is assumed. In the distance measurement device according to the line COMP2, a case where a distance is measured using a single pulse having a pulse width triple that of a single pulse of laser light L1 emitted from the distance measurement device 1 according to the first embodiment is assumed. The laser power in the line COMP1 is ⅓ of that in the line EMB, and the laser power in the line COMP2 is equivalent to that in the line EMB. As for a pulse height of a laser (laser output), using a maximum pulse height in each case is assumed. Since a measureable distance, which is crucial in LiDAR, is determined by a laser power (pulse width), the present embodiment greatly excels in its measurable distance compared to the comparative example indicated by the line COMP1 (roughly speaking, the first embodiment excels by 30%).

In any of the first embodiment and comparative examples, a pulse included in the reflected light L2 is lost as the distance to the target TG becomes longer. In the case of the line COMP1, a distance is measured using a single pulse; thus, if the pulse is lost, a distance cannot be accurately measured. For this reason, variations in errors may rapidly deteriorate as a pulse loss occurs. In contrast, three pulse are used to measure a distance in the first embodiment. For this reason, even at the occurrence of pulse loss, more robust distance measurement can be performed in the first embodiment than in the comparative example. Furthermore, since the number of pulses is relatively small, namely 3, it is possible to minimize errors in distance when a reflected light L2 cannot be identified for laser light L1. Thus, it is possible to suppress variations in a measured distance. In the line COMP2 on the other hand, the probability that all the pulses will be lost is low. However, a pulse width represents a maximum error value when a reflected light is received; for this reason, the maximum error value in the line COMP2 is also triple that in the line COMP1. In contrast, the pulse width in the first embodiment does not change from that in the line COMP1, and when a pulse loss is identified, the maximum error value does not differ from that in the line COMP1. For these reasons, the first embodiment is excellent in the accuracy of distance compared to the lines COMP1 and COMP2.

The first filter 74 performs filtering on the input data FIRIN over whole range sampling time, and generates output data FIR1OUT. The first peak candidate detection section 75 detects, as first peak values, q peaks in descending order of the output values from the output data FIR1OUT. The second filter 76 performs filtering on the input data FIRIN in the vicinity of q first peak candidates (in the range of ±3D), and generates the output data FIR2OUT at six points. The second peak candidate detection section 77 detects, as a second peak candidate, a peak having a largest output from the output data FIR2OUT at six points for each of q first peak candidates. Thus, when a peak corresponding to time kx that needs to be truly detected is not included in the first peak candidates, it is possible to detect the peak as a second peak candidate. For this reason, in the case where two of three pulses are lost and a peak at which an output value is significantly large does not appear when the first peak candidates are detected, it is possible to lower a probability of failure in detecting a peak corresponding to time kx that should be truly detected (identification failure).

The reliability calculation section 78 calculates a reliability based on the reflected light L2 detected in a pixel PX next to a pixel PX targeted for a distance measurement operation for each of the first peak candidates and second peak candidates. Thus, even in a case where a sufficient number of pulses to identify a reflected light L2 cannot be detected in a pixel PX targeted for a distance measurement, it is possible to increase a probability of accurate distance measurement by using information of neighboring pixels PX in which a number of pulses sufficient for identifying a reflected light L2 can be detected. Thus, it is possible to suppress variations in a measured distance.

2. Second Embodiment

Next, a distance measurement device according to a second embodiment is described. In the first embodiment, a case where an output signal IOUT of a size within a threshold is obtained in the light receiver 31 and thereby multiple pulses can be separated. The second embodiment differs from the first embodiment in that an output signal IOUT is piled up as a result of obtaining the output signal IOUT of a size exceeding a threshold and multiple pulses cannot be separated in the light receiver 31. In the following, descriptions of configurations and operations similar to the first embodiment will be omitted, and differences will be mainly described.

2.1 Configuration of Digital Processing Section

FIG. 16 is a block diagram to explain a configuration of a digital processing section according to the second embodiment and corresponds to FIG. 6 of the first embodiment.

As shown in FIG. 16, the digital processing section 42 further includes a determination section 80.

The determination section 80 determines whether or not an AFE output that is input from the AFE 41 is piled up. Specifically, for example, the determination section 80 determines that the AFE output is piled up when the value of the AFE output is equal to or greater than a threshold S1, and transmits the AFE output to the distance measurement section 79. The determination section 80 determines that the AFE output is not piled up when the value of the AFE output is less than the threshold S1, and transmits the AFE output to the preprocessing section 71. A method for determining whether there is a pile up is not limited to the above-described method in which whether or not the AFE output value is equal to or greater than the threshold S1 is determined. For example, the determination section 80 may determine whether there is a pile up based on whether or not a length of time during which the AFE output value is equal to or greater than the threshold S1 is equal to or greater than a threshold. The determination section 80 may determine whether there is a pile up based on a size of a time integration value of the AFE output.

When a piled-up AFE output is received from the determination section 80, the distance measurement section 79 identifies a certain position of the AFE output with respect to laser light L1 and measures a distance based on the identification result.

2.2 Distance Measurement Operation

FIG. 17 is a flowchart showing a distance measurement operation in the distance measurement device according to the second embodiment, and corresponds to FIG. 11 of the first embodiment. In FIG. 17, steps ST5 and ST60 are added to steps ST10 to ST50 shown in FIG. 11.

As shown in FIG. 17, in step ST5, the determination section 80 determines whether or not the reflected light L2 received by the light receiver 31 is piled up. When the received reflected light L2 has not been piled up (No in step ST5), the processing proceeds to step ST10. Since the processing in step ST10 and thereafter is the same as that in the first embodiment, description is omitted.

When the received reflected light L2 is piled up (Yes in step ST5), the determination section 80 transmits the AFE output to the distance measurement section 79 and the processing proceeds to step ST60.

In step ST60, the distance measurement section 79 generates distance measurement data based on a time difference between certain positions of the laser light L1 and the AFE output based on the reflected light L2. The certain positions include a position at which each of the laser light L1 and the AFE output rises, for example.

With the above-described operation, a distance measurement operation in the occurrence of a pile up is finished.

Figure 18:
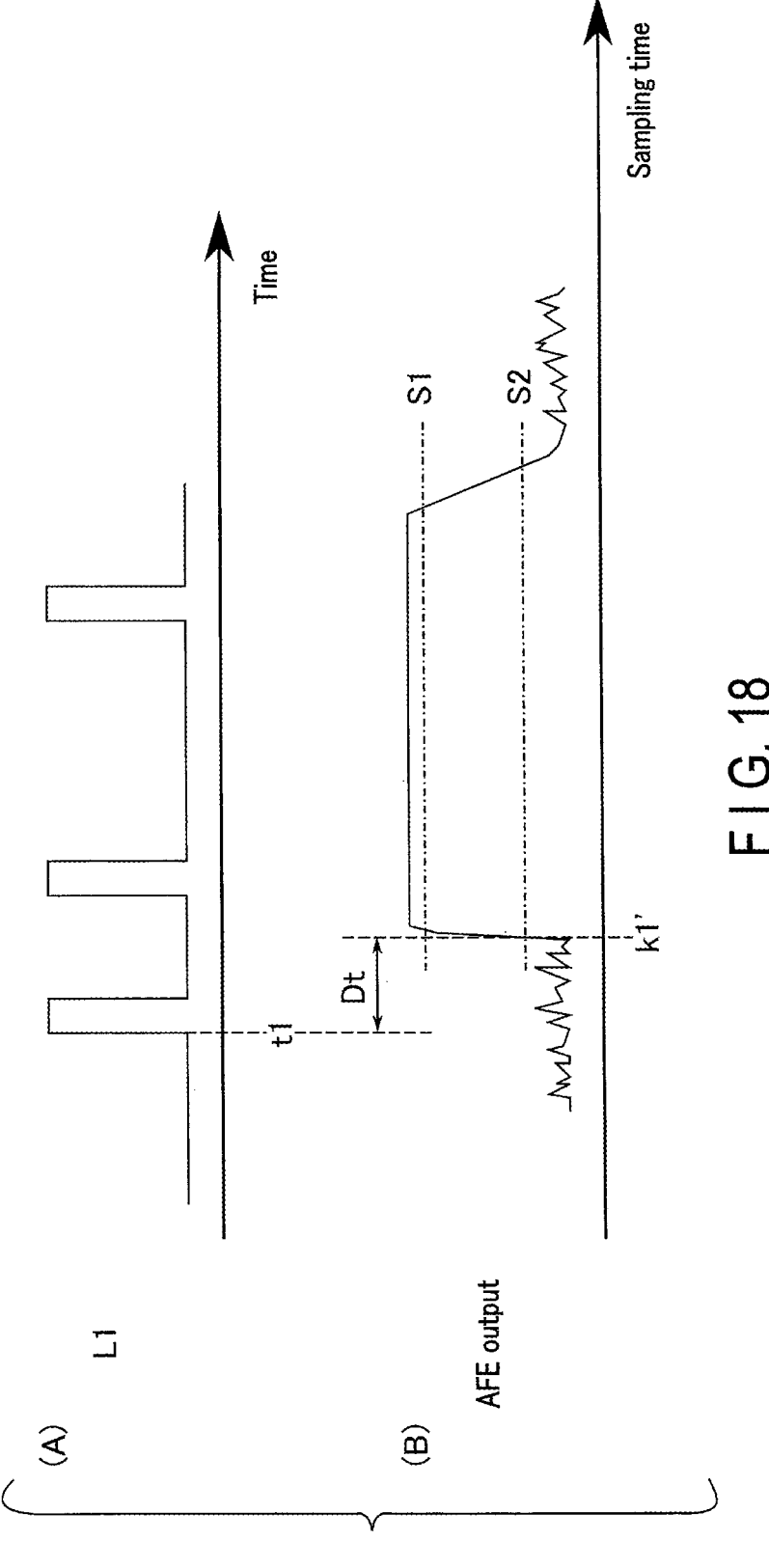
FIG. 18 is a diagram for explaining waveforms of various signals relating to a distance measurement operation in the distance measurement device according to the second embodiment.

FIG. 18 is a diagram showing waveforms of various signals relating to a distance measurement operation in the distance measurement device according to the second embodiment, and corresponds to FIG. 12 of the first embodiment. FIG. 18 shows waveforms in the case where the AFE output is piled up, and the input data FIRIN is omitted.

As shown in FIG. 18, the distance measurement section 79 regards time k1' at which the AFE output value changes from less than the threshold S2 to a value equal to or greater than the threshold S2 as a rise of the AFE output, and calculates a time difference Dt between this time k1' and time t1 at which the first pulse of laser light L1 rises. The detection at time k1' is performed by a TDC in the AFE 41. The threshold S2 is less than a threshold S1, and is preset as a value larger than a noise component in the AFE output, for example. Generally, a TDC has a higher time resolution than an ADC, and the distance measurement section 79 is able to measure a distance to the target TG based on a time difference Dt at a high accuracy in terms of time.

Generally, in the occurrence of a pile up, there is almost no possibility that the first pulse will be lost; therefore, the AFE 41 detects a time relating to the first pulse as time k1'. In the second embodiment, on the other hand, the distance measurement section 79 detects a time relating to the second pulse; therefore, there is a time difference of, theoretically, one cycle, between a time detected by the AFE 41 and a time detected by the distance measurement section 79. Accordingly, in step ST60, the distance measurement section 79 outputs a result to which a correction equivalent to 1 cycle is added so as to achieve consistency with the time that is output in step ST50.

The distance measurement section 79 detects a peak time of a pulse in step ST50, and detects a rise of the pulse in step ST60; for this reason, correction based on a peak value and a waveform is performed on the detected time. In other words, in addition to the above-described correction equivalent to one cycle, the correction based on the peak value and waveform is taken into account by the distance measurement section 79 to calculate a time of arrival and to calculate a time difference Dt.

The determination process in the determination section 80 is not necessarily performed between the process in the AFE 41 and the process in the preprocessing section 71. For example, the distance measurement section 79 may always perform the processing in both step ST50 and ST60 and output two types of distance, etc., and the determination section 80 may perform a determination process at a stage after the processing in those two steps.

2.3 Advantageous Effects of Present Embodiment

In a case where a target object TG is relatively close to the distance measurement device 1, reflected light L2 of a large light quantity may be received by the light receiver 31, and an output signal IOUT and an AFE output that is subsequently output may be piled up.

According to the second embodiment, the distance measurement section 79 detects time k1' at which the piled-up AFE output exceeds the threshold S2 as a predetermined position of a received pulse. It is thereby possible to measure a distance to the target object TG accurately even in the case where signal components corresponding to three pulses cannot be separated because of excessive intensity of the AFE output.

In there is no occurrence of a pile up, the TDC has a high time resolution and therefore has a high probability of obtaining a highly accurate result. Without time correction, a result would be different from the result obtained in the first embodiment by one cycle; with time correction on the other hand, a result not contradictory to the result in the first embodiment can be obtained.

2.4 Modifications

In the foregoing second embodiment, the case where a time difference between a pulse of laser light L1 and time k1' at which the AFE output becomes equal to or greater than a threshold S2 is measured, but the second embodiment is not limited thereto.

For example, the distance measurement section 79 may measure a time difference between a pulse of laser light L1 and a certain time selected from a period of time during which the AFE output becomes equal to or greater than the threshold S2.

Figure 19:
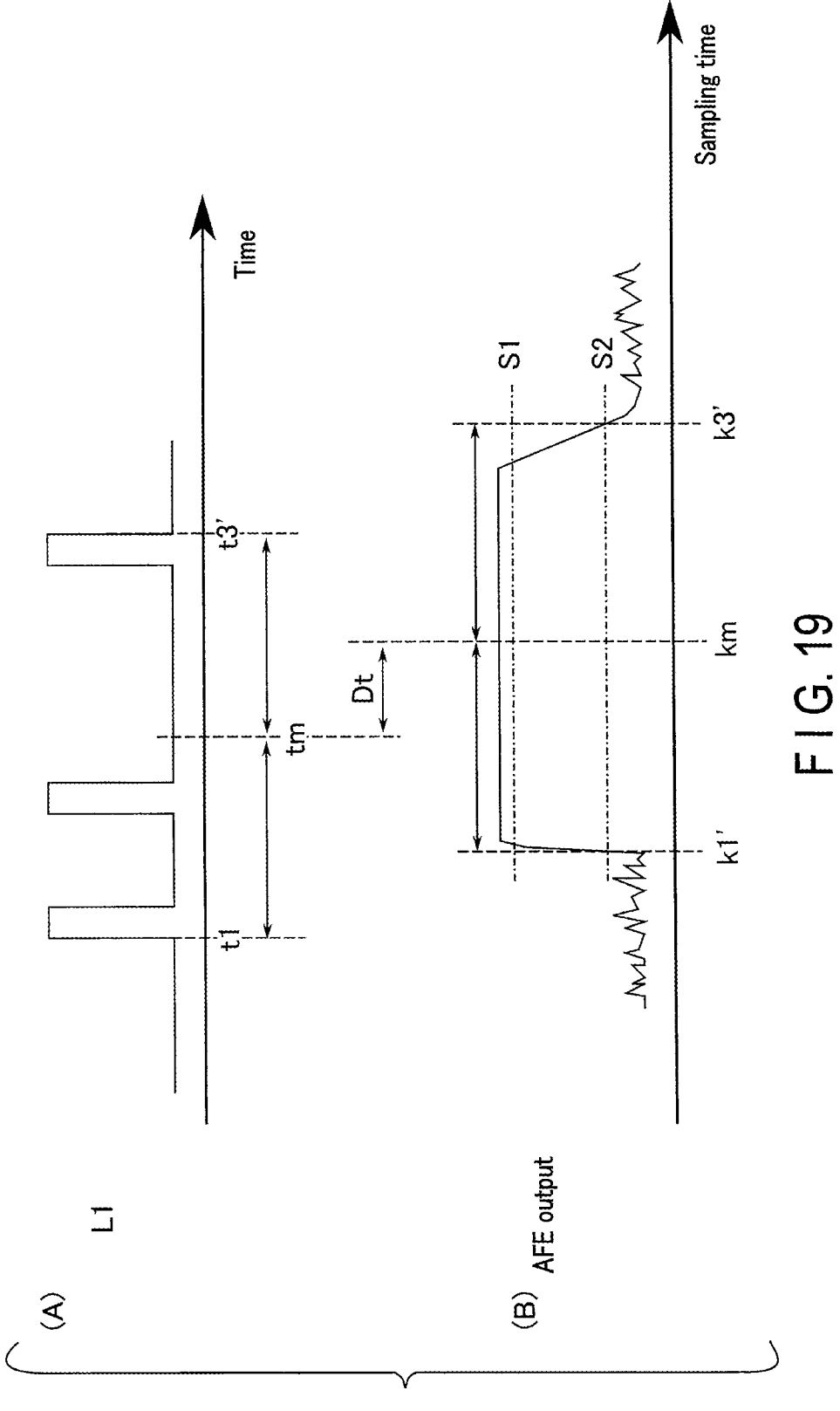
FIG. 19 is a diagram for explaining waveforms of various signals relating to a distance measurement operation in the distance measurement device according to a modification of the second embodiment.

FIG. 19 is a schematic diagram for explaining a distance measurement operation in the distance measurement device according to a modification of the second embodiment, and corresponds to FIG. 18 of the second embodiment.

As shown in FIG. 19, the distance measurement section 79 may detect a time km that exists in a period from time k1' to k3' at which the AFE output value that is equal to or greater than the threshold S2 changes to a value less than the threshold S2. Time km may be time $C1 \times k1' + (1-C1) \times k3' + C2$, which is obtained by a weighted average of the time k1' and time k3'. Herein, C1 takes a different value depending on a peak value and a time integration value, etc. C2 is a constant, for example a time corresponding to +0.5 cycles. The distance measurement section 79 then may calculate a time difference Dt between the time km and time tm, which is an intermediate time in a period from time t1 at which a first pulse of laser light L1 rises to time t3' at which the third pulse drops. Thus, the distance measurement section 79 is able to measure a distance to a target object TG based on a time difference Dt. Furthermore, with C1, it is possible to eliminate peak-dependent influence on a trailing edge waveform unique to SiPM, and with C2, it is possible to eliminate influences due to a use of multiple pulses, and thereby accuracy in distance is improved.

For example, in order to eliminate peak value-dependency in a threshold, the AFE 41 may provide a constant fraction discriminator (CFD) before the TDC.

FIG. 20 is a block diagram for explaining a configuration of the AFE of the distance measurement device according to a modification of the second embodiment.

As shown in FIG. 20, the AFE 41 may further include CFD 41*b* in addition to the above-described TIA 41*a* and TDC 41*c*. The CFD 41*b* includes an attenuation circuit 41*b*_1, an inverse circuit 41*b*_2, a delay circuit 41*b*_3, and an adder 41*b*_4.

An input terminal of the attenuation circuit 41*b*_1 and an input terminal of the inverse circuit 41*b*_2 are coupled in common to an output terminal of the TIA 41*a*. An output terminal of the inverse circuit 41*b*_2 is coupled to an input terminal of the delay circuit 41*b*_3. An output terminal of the attenuation circuit 41*b*_1 and an output terminal of the delay circuit 41*b*_3 are coupled to a first input terminal and a second input terminal of the adder 41*b*_4, respectively. An output terminal of the adder 41*b*_4 is coupled to the TDC 41*c*.

With such a configuration, it is possible to suppress an influence caused by the change of a time at which the threshold S1 is reached in accordance with the peak value of the AFE output and to improve accuracy in distance.

3. Others

The foregoing descriptions of the several embodiments have been made but the first and second embodiments are not limited to the above and various modifications are applicable.

For example, in the foregoing first and second embodiments, a plurality of pixels PX are arranged in a two-dimensional manner on the semiconductor substrate; however, the embodiments are not limited to this example. For example, a plurality of pixels PX may be arranged in a one-dimensional manner.

The configuration of the emission pulse used in a single distance measurement operation, for example, is not limited to the example described in the foregoing first and second embodiments.

Figure 21:
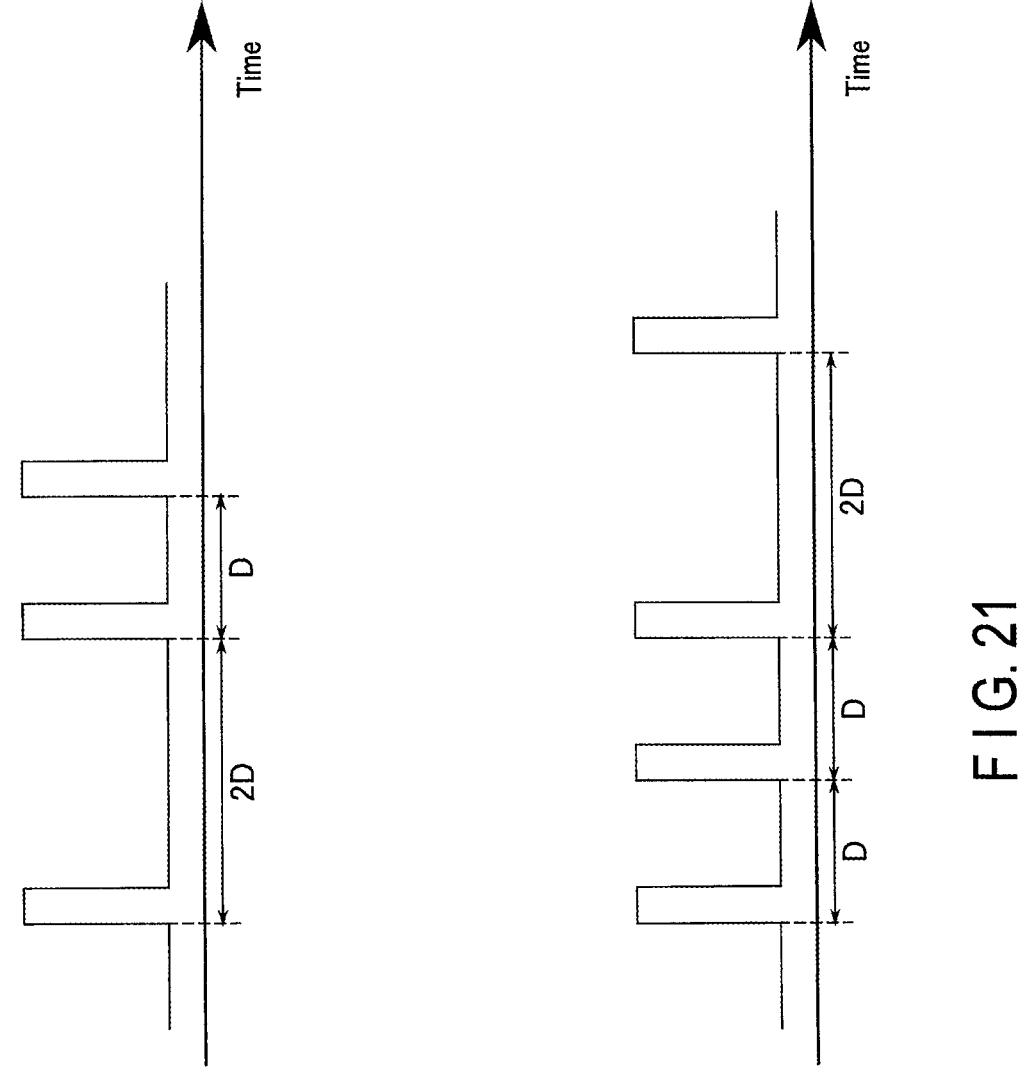
FIG. 21 is a diagram for explaining emitted pulses in a distance measurement device according to another modification.
Figure 21:

FIG. 21 is a diagram showing an example of emitted pulses in the distance measurement device according to another modification.

As shown in FIG. 21(A), a set of emitted pulses used in a single distance measurement operation may be set in such a manner that an interval between the second emitted pulse and the third emitted pulse is shorter than that between the first emitted pulse and the second emitted pulse. In this case, the coefficients H0 to H3 of the multiplier 82 in the first filter 74 and the second filter 76 shown in FIG. 7 will be set to "1", "0", "1", and "1", respectively. It is thereby possible to achieve advantageous effects similar to those in the foregoing first and second embodiments.

As shown in FIG. 21(B), the number of pulses used in a single distance measurement operation may be larger than 3 (for example, 4). In this case, each of the first filter 74 and the second filter 76 further includes a register 81_4, a multiplier 82_4, and an adder 83_4 (all of which are not shown), in addition to the structures shown in FIG. 7.

The register 81_4 includes an input terminal coupled to the output terminal of the register 81_3. The multiplier 82_4 includes an input terminal coupled to an output terminal of the register 81_4, and a coefficient H4 is set thereto. The adder 83_4 includes a first input terminal coupled to the output terminal of the multiplier 82_3, a second input terminal coupled to an output terminal of the multiplier 82_4, and an output terminal coupled to the second input terminal of the adder 83_3. The coefficients H0-H4 of the multiplier 82 in this case are set to "1", "1", "1", "0", "1", respectively. Thus, it is possible to identify which emitted pulse is lost when one emitted pulse is lost. Furthermore, even in the case where two emitted pulses are lost, it is still possible to identify the lost pulses, if the second pulse and the third pulse are lost, for example.

Thus, the number of emitted pulses is not limited. It is crucial that an emitted pulse be asymmetrical with respect to time, and its asymmetry produces an effect of increasing a probability of lost pulse identification.

Furthermore, for example, in the foregoing first and second embodiments, the case is described where the second filter 76 operates based on the same filter function F as the first filter 74; however, the embodiments are not limited to this. For example, the second filter 76 may be configured so as to operate based on a filter function differing from that of the first filter 74. In the case where the second filter 76 is configured so as to operate based on the same filter function F as that of the first filter 74, the first filter 74 and the second filter 76 may be realized by a single filter.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit.

What is claimed is:

1. A distance measurement device comprising:
a light source;
an optical system configured to emit emission light from the light source and to receive reflected light of the emission light;
a plurality of pixels configured to detect the received reflected light, each including at least one sensor, and arranged in a pixel area on a substrate; and
a control circuit, wherein
the control circuit is configured to:
identify first reflected light detected in a first pixel in association with first emission light; and
measure a distance based on a time difference between the first emission light and the identified first reflected light,
the first emission light includes a first pulse, second pulse, and third pulse in succession,
a first interval between the first pulse and the second pulse differs from a second interval between the second pulse and the third pulse,
the first reflected light corresponds to at least two of the first pulse, the second pulse, and the third pulse,
the control circuit is configured to:
detect a first peak candidate in which the first reflected light becomes maximum;
further detect a second peak candidate in which the first reflected light becomes maximum in the vicinity of a time corresponding to the first peak candidate; and
identify the first reflected light based on the first peak candidate and the second peak candidate,
the control circuit includes a finite impulse response (FIR) filter, and is configured to detect the first peak candidate and the second peak candidate by the FIR filter, and
a sampling interval of the FIR filter is equal to shorter a one of the first interval and the second interval.

2. The distance measurement device according to claim 1, wherein the control circuit is configured to further detect the second peak candidate in a range from a time corresponding to the first peak candidate to a sum of the first interval and the second interval.

3. The distance measurement device according to claim 1, wherein a brightness of the second peak candidate is lower than a brightness of the first peak candidate.

4. The distance measurement device according to claim 1, wherein the control circuit is configured to identify the first reflected light based on second reflected light detected in a second pixel adjacent to the first pixel.

5. The distance measurement device according to claim 1, wherein the second interval is double the first interval.

6. The distance measurement device according to claim 1, wherein the first pulse, the second pulse, and the third pulse have the same brightness and the same pulse width.

7. The distance measurement device according to claim 6, wherein the first interval and the second interval are longer than a sum of the pulse width and a time constant of a recovery response of the first pixel.

8. The distance measurement device according to claim 1, wherein the first interval and the second interval are longer than a time-converted distance measurement accuracy of the measured distance.

9. The distance measurement device according to claim 1, wherein the control circuit is configured to measure the distance based on, when a brightness of the first reflected light is equal to or greater than a first threshold, a difference between a first time at which the first pulse of the first emission light rises and a second time at which the brightness of the first reflected light exceeds a second threshold which is smaller than the first threshold.

10. The distance measurement device according to claim 1, wherein the control circuit is configured to measure the distance based on, when a brightness of the first reflected light is equal to or greater than a first threshold, a difference between a third time and a fourth time, the third time being between when the first pulse of the first emission light rises and when the third pulse falls, the fourth time being between when the brightness of the first reflected light exceeds a second threshold and when the brightness becomes lower than the second threshold, the second threshold being smaller than the first threshold.

11. The distance measurement device according to claim 1, wherein the at least one sensor includes an avalanche photodiode whose anode is coupled to a first power supply node, and a quench element whose first end is coupled to a second power supply node and second end is coupled to a cathode of the avalanche photodiode, and the control circuit applies a first voltage to the first power supply node and a second voltage higher than the first voltage to the second power supply node while turning the sensor on.

* * * * *